United States Patent
Nitschke et al.

(10) Patent No.: US 10,331,443 B2
(45) Date of Patent: Jun. 25, 2019

(54) DATA ORGANIZATION PROCEDURE AND DEVELOPMENT ENVIRONMENT SYSTEM

(71) Applicant: Phoenix Contact GmbH & Co. KG, Blomberg (DE)

(72) Inventors: Torsten Nitschke, Lemgo (DE); Benno Heines, Detmold (DE); Rolf Salzmann, Lemgo (DE); Carsten Kolodziej, Steinheim (DE); Robert von der Ahe, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 15/623,350

(22) Filed: Jun. 14, 2017

(65) Prior Publication Data

US 2017/0364355 A1  Dec. 21, 2017

(30) Foreign Application Priority Data

Jun. 15, 2016  (DE) .................. 10 2016 110 939

(51) Int. Cl.
*G06F 8/71* (2018.01)
*G06F 8/77* (2018.01)
(Continued)

(52) U.S. Cl.
CPC .................. *G06F 8/77* (2013.01); *G06F 8/71* (2013.01); *G06F 11/3688* (2013.01); *G06F 16/00* (2019.01); *G06F 21/6218* (2013.01)

(58) Field of Classification Search
CPC ......................................... G06F 21/60–21/645
See application file for complete search history.

(56) References Cited

U.S. PATENT DOCUMENTS 7,496,583 B2 * 2/2009 Moore ................... G06F 16/10
8,108,430 B2 * 1/2012 Wong ..................... G06F 16/26
707/792

(Continued)

FOREIGN PATENT DOCUMENTS

CN  104106276 A  10/2014
CN  105324750 A  2/2016
(Continued)

OTHER PUBLICATIONS

Truong, Dan N., et al., "Improving cache behavior of dynamically allocated data structures," pp. 1-8, https://ieeexplore.ieee.org/abstract/document/727268, retrieved on Jan. 28, 2019. (Year: 1998).*

(Continued)

*Primary Examiner* — Geoffrey R St Leger
*Assistant Examiner* — Christopher J Franco
(74) *Attorney, Agent, or Firm* — John Maldjian; Maldjian Law Group LLC

(57) ABSTRACT

Embodiments involve a data organization procedure and a development environment system that is set up to carry out the data organization procedure. The data organization procedure according to an embodiment envisages that a stored data set or a data set to be stored is organized according to a first structure, whereby the data set is subdivided according to aspects of the content and/or according to access rights aspects into partial data sets, whereby in addition to the first structure another structure is envisaged, according to which the data set is organized, whereby the data set is subdivided into authority areas, whereby each authority area includes at least one partial data set according to the first structure, whereby each partial data set includes at least one data unit, and whereby a responsible user set is allocated to each authority area, whereby the user set includes at least one user.

21 Claims, 14 Drawing Sheets

(51) Int. Cl.
*G06F 11/36* (2006.01)
*G06F 21/62* (2013.01)
*G06F 9/44* (2018.01)
*G06F 16/00* (2019.01)

(56) References Cited

U.S. PATENT DOCUMENTS

| | | | | |
|---|---|---|---|---|
| 8,195,646 | B2* | 6/2012 | Evans | G06F 17/301 |
| | | | | 707/716 |
| 9,684,505 | B2* | 6/2017 | Kaneki | G06F 8/70 |
| 2005/0246352 | A1* | 11/2005 | Moore | G06F 16/10 |
| 2006/0004873 | A1* | 1/2006 | Wong | G06F 16/26 |
| 2006/0242164 | A1* | 10/2006 | Evans | G06F 17/30126 |
| 2008/0127135 | A1* | 5/2008 | Bergstrom | G06F 8/447 |
| | | | | 717/140 |
| 2016/0070565 | A1* | 3/2016 | Kaneki | G06F 8/70 |
| | | | | 717/101 |
| 2017/0236081 | A1* | 8/2017 | Grady Smith | G06Q 10/0637 |
| | | | | 705/7.36 |
| 2017/0364355 | A1* | 12/2017 | Nitschke | G06F 8/77 |

FOREIGN PATENT DOCUMENTS

| | | |
|---|---|---|
| DE | 112013007160 T5 | 3/2016 |
| JP | 05113877 A | 5/1993 |
| JP | 2000076049 A | 3/2000 |
| WO | 2013/056104 A1 | 4/2013 |

OTHER PUBLICATIONS

Tsichritzis, D.C., "Hierarchical Data-Base Management: A Survey," pp. 105-123, https://dl.acm.org/citation.cfm?id=356667, retrieved on Jan. 28, 2019. (Year: 1976).*

Johnson, B. et al., "Tree-Maps: A Space-Filling Approach to the Visualization of Hierarchical Information Structures," p. 284-291, https://ieeexplore.ieee.org/stamp/stamp.jsp?tp=&arnumber=175815, retrieved on Jan. 28, 2019. (Year: 1991).*

Rogers, Anne et al., "Supporting Dynamic Data Structures on Distributed-Memory Machines," pp. 233-263, https://dl.acm.org/citation.cfm?id=201065, retrieved on Jan. 28, 2019. (Year: 1995).*

Huang, J.C. et al., "A Note on Information Organization and Storage," pp. 406-410, https://dl.acm.org/citation.cfm?id=362285, retrieved on Jan. 28, 2019. (Year: 1973).*

Liu, Wen-yu et al., "Role-based Access Control in Geological Database Web System," pp. 1-3, https://ieeexplore.ieee.org/stamp/stamp.jsp?tp=&arnumber=5363790, retrieved on Jan. 28, 2019. (Year: 2009).*

* cited by examiner

DATA ORGANIZATION PROCEDURE AND DEVELOPMENT ENVIRONMENT SYSTEM

FIELD

The invention involves a data organization procedure and a development environment system, which is set up to carry out the data organization procedure.

Development environment systems are implemented for processing development projects of various types and can be set up variously according to the area for which they are used. As a rule, development environment systems prepare for the user a development environment with a user interface or user surface, and permit processing a development project and storing development project data. Because of the scope and complexity of many development projects, it has also become increasingly necessary and customary that many development environments permit the processing of a development project by multiple users. Examples of development environment systems are text processing systems, image processing systems, desktop publishing systems, editing systems, content management systems, and software development systems. Thereby a development project may concern a publishing project such as a book or a website or a software project, such as control software for an automation unit.

SUMMARY

This invention will be discussed mainly based on the example of a development project that involves the creation of processing of such management software for an automation unit. However, the invention is basically applicable for other development projects.

The development environment of a development environment system for software projects will be described below also as a development tool or software tool, whereby a development environment may include more than such a tool. In addition, in the following text the management software for an automation unit is also designated as an automation solution. An automation unit, such as for carrying out a manufacturing process, typically includes at least one control unit, in particular a programmable and storable control unit (SPS), and several control devices, which in each case are outfitted with sensors and/or actors, whereby the control unit and the devices have communication connections between them via a network or a bus.

BRIEF DESCRIPTION OF THE DRAWINGS

These and other characteristics as well as the many advantages of this invention also result under the example of the embodiment that discussed more specifically below with relation to the attached drawings. These show.

DETAILED DESCRIPTION

Within the automation technology, an SPS or a device as a rule is configured and/or programmed with a software tool. Whereas earlier various software tools were used for various tasks, in the meantime complete automation solutions with a comprehensive software tool have been created and set up. For example, previously the visualization of states of a control device was created on a display panel with a special software tool for what is called a "human machine interface" (abbreviated as HMI), while the actual process regulation was created and expected with a software tool for programming languages according to standard IEC 61131 part 3, that is, in the version applicable to the relevant time period for this application. The current state of the art is that the same software tool is used for the creation and processing of the HMI as well as for the process regulation, and the entire automation solution is totally set up in a collection of files or even a single file. By means of the software tool, out of such an automation solution ideally all devices and the control device of an automation unit can be taken care of by configuration and programming. For this purpose the software tool is commanded by a user to create usable settings and executable program files from the projected automation solution directly from the devices and the automation device and to distribute these to them.

Figure 1:
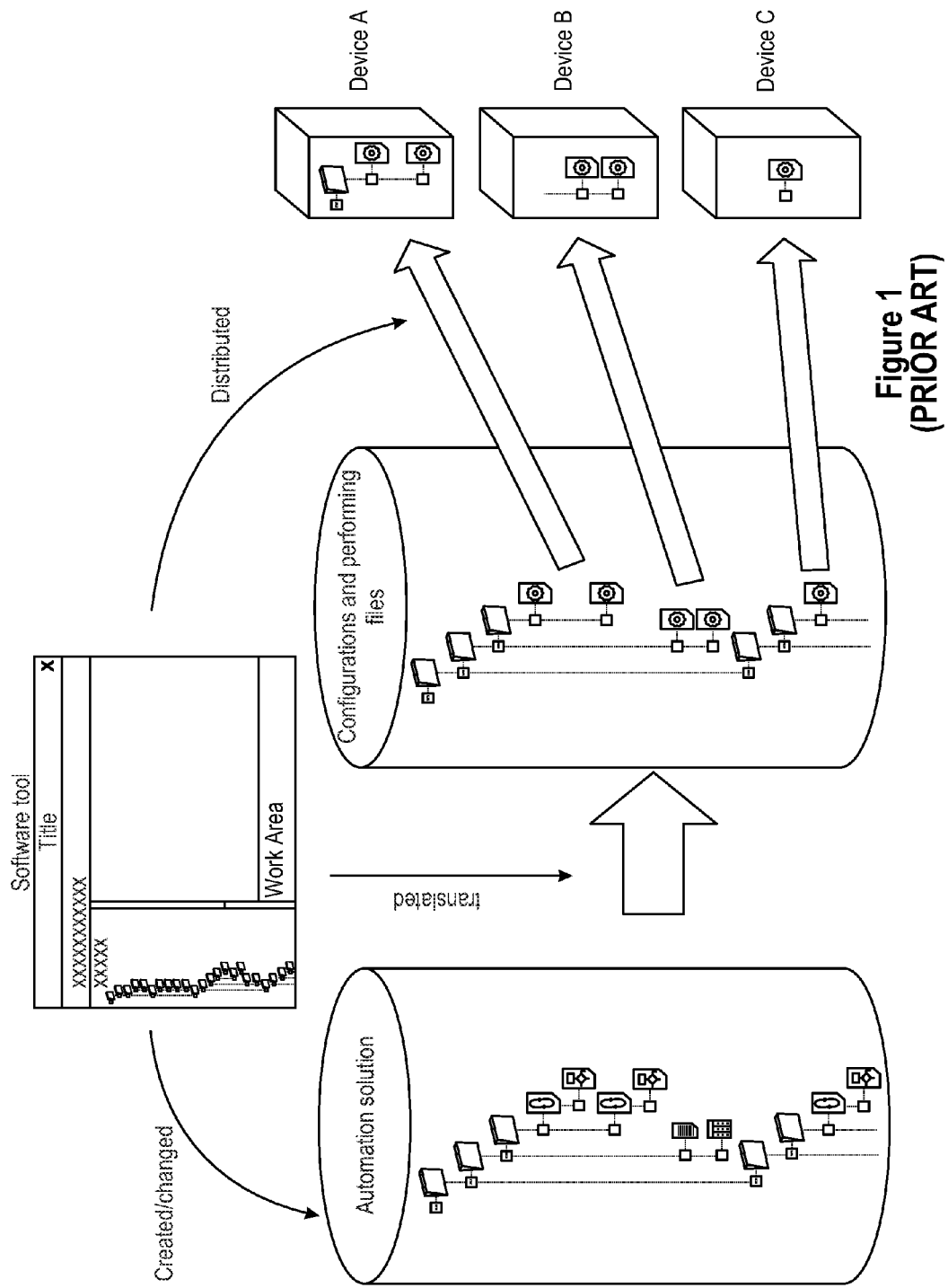
FIG. 1, a schematic presentation of the example of a scenario according to the state of the art of technology, in which an automation solution is created and processed with a software tool and is translated into configuration and implementable data, which are then distributed to the individual devices.

An example of such a scenario is one in which by means of a software tool an automation solution is created and processed and is transferred into a configuration and executable data, which is then distributed to the individual devices, as schematically shown in FIG. 1. It is obvious that in place of the three devices A, B, and C shown in FIG. 1 or supplements thereto, a control device that is not presented here could also be planned.

It has also become customary that several specialized tasks are processed and expected in an automation solution and with the same software tool. For this purpose users from various specialty areas and with various specialty emphases use the same software tool, and work on the same set of files for the same file, which is described in total by an automation solution.

Such projects occur sequentially or overlapping in time.

Traditionally automation solutions of software tools are structured hierarchically as illustrated by the architectural model defined in Standard IEC 61131 Part 3. Other information models are also oriented to this form of hierarchical arrangement, such as those from the OPC Foundation (Open Platform Communications) for the representation of information from storable and programmable devices according to the OPC Unified Architecture (OPC UA).

Figure 2:
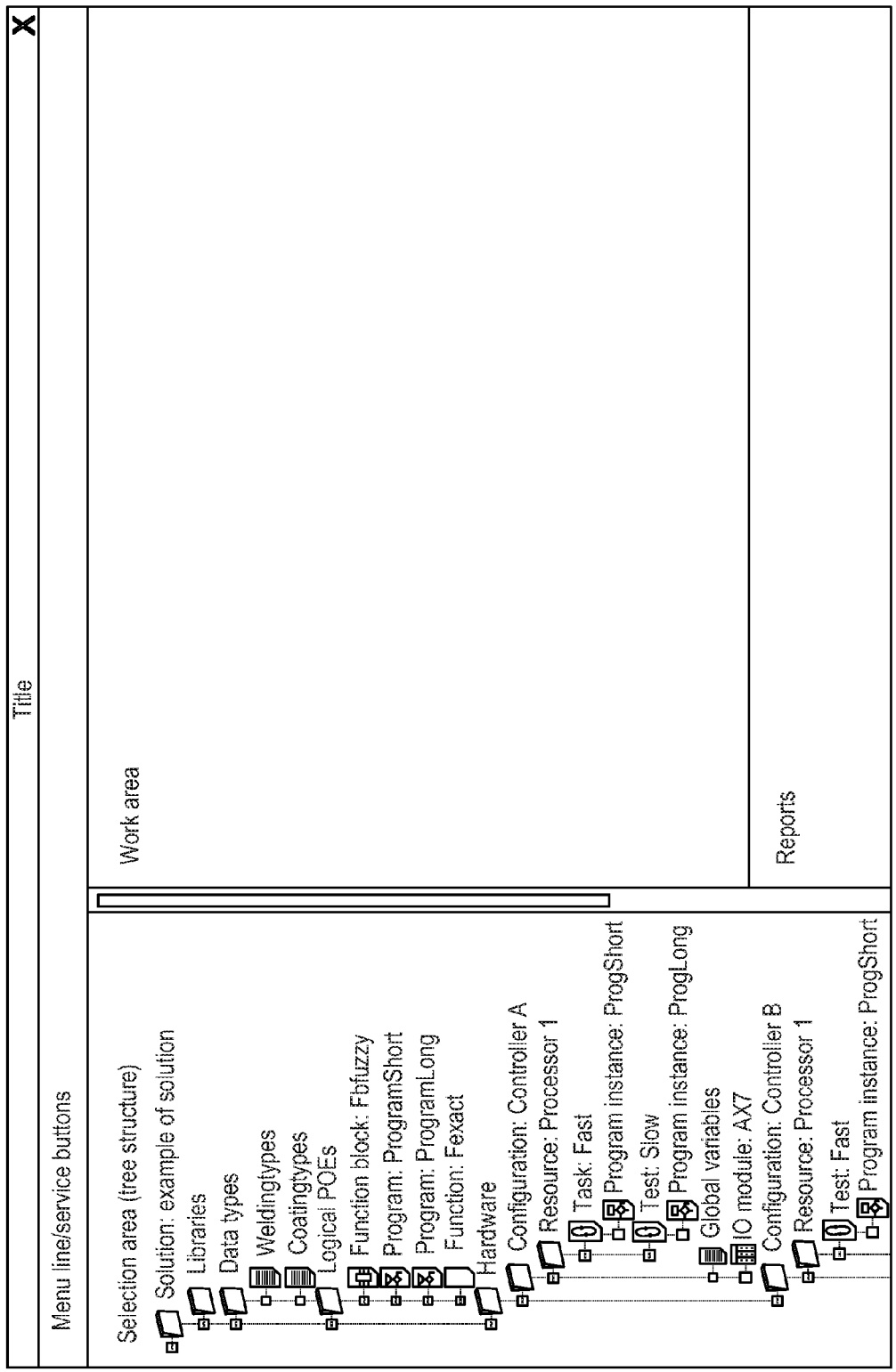
FIG. 2, a schematic presentation of a typical user surface of a development environment and a software tool for development projects in accord with the state of the art of technology.

FIG. 2 shows an illustration of a particular user surface of a development environment or a software tool. Typically software tools present the items of the automation solution in the selection area of their user surface as a pulldown and closable tree based on the hierarchy of the architectural model according to IEC 61131 Part 3. An automation solution contains or references libraries with functions and function building blocks, which are used in the automation solution. Data types are defined on the same level of hierarchy as the libraries, whereby several data types can be defined summarily on a worksheet for the purpose of structuring. In the example, the worksheets "Welding Types" and "Coding Types" exist for the definition of solution specific data types. On the same level as the compilation of the data types, program organization units (POEs) are also given a summary explanation. In the example, under the node "Logical POEs", the following units are found: Function block "FBfuzzy", program "ProgramShort", program "ProgamLong", and function "Fexact". Each POE is further structured for example in worksheets with local variables and worksheets with a source test for implementing the program, the function, or the block. The compilation of the hardware, which is subdivided into configurations, is also found on the level of the compilation of all libraries, data types, and logical POEs. In the example, under the node "Hardware" the configurations "ControllerA" and "Controllers" exist, which in each case come from a specific resource (Processor 1), global variables, and an IO module. For example, the resources named "Processor1 " are once again subdivided into performance units (tasks) named "Fast" and "Slow", each of which is assigned to a program section named "ProgShort" and "ProgLong".

Instances of programs are for example instances of programs explained under the logical POEs.

From the example it is apparent that the structuring of an automation solution is oriented to the architecture model for programming according to IEC 61131 Part 3.

Through standard software tools for automation solutions, such as MULTIPROG version 5.50, PC WorX revision 6.10, or CodeSys V3.5, individual automation solutions are stored in this structuring, meaning that the inner structure of the file is created or the organization of the data collection in data directories follow this architecture model of IEC 61131 part 3.

The noted software tools as a rule also permit setting processing rights by individual users on the nodes of the tree example presented for the automation solution in FIG. 2. How many various user types can be set depends on the particular software tool. As a rule the rights to the subordinate nodes also are in effect, meaning that they are inherited, whereby the rank follows in the tree of the architecture model according to IEC 61131 part 3.

An example of the distinction between two different types of user groups is given by the software tool MULTIPROG in version 5.50. A group of users knows a password given initially for the project, while another group of users does not know it. If a user correctly enters a password after opening the automation solution, then the solution can be used to its full extent; otherwise it can only be used according to the rights that are set by giving the password previously set for the nodes. In such cases of implementation according to the state of the art of technology, the processing protection is maintained by the software tool.

However, a user who does not know the password could still manipulate the stored data of the automation solution beyond the set limits with another software tool, for example an editor generally working on binary data, such as what is called a hex editor. Thereby possibly existing test totals could be so manipulated that the actual software tool is then only in a position to recognize improper manipulation if the new password is entered or if a newly calculated test total is compared with a test total noted previously elsewhere outside the automation solution. This last comparison for example is in use for automation solutions, which have been certified according to the guidelines for functional safety.

Another example is given by the software tool CodeSys V3.5, in which the nodes of the tree of the automation solution can be established in the form of a rights matrix, showing which user can take which action in engineering or on the objects of the particular tree part.

A special case is also given by the so-called address table or linking table, henceforth also called by its abbreviation (VKT), in an automation solution. Thus the standard software tools for creation and care of automation solutions allow linking variables with entries and outputs of POEs and entries and outputs of (physical) IO modules for linking, and then to change these links in the course of the development. Now these links cannot always be ordered unambiguously according to a node of the tree within the automation solution. Rather it occurs or it is required that a variable linked simultaneously with several entries or outputs. The administration of such links occurs therefore through all hierarchical levels of the automation solution. Ordinarily, the links are taken care of in the noted address or link table of an automation solution, which for example has the form of a matrix and is stored in the order of the entire solution if there is no particular ordering.

Often it is desirable or necessary in processing an automation solution with the software tool that is storing the current version that the prior version be maintained, perhaps for documentation purposes, and not simply overwritten. The competence areas of general information technology are known that include versioning tools for version administration tools for documentation and for comprehending various revisions of the same program source text or a structured collection of source texts. Generally, version administration tools administer revisions files of any content that are organized in a hierarchy of data directories. As an example, the version administration tools Subversion (SVN) and GIT are noted. These generally administer program source texts in the form of text files, but may also involve any data contents, such as binary data.

Version administration tools as a rule can administer several repositories of collections of files.

It is known from the software tool CodeSys V3.5 that for example interaction may occur directly with the version administration tool Subversion and there store the automation solution as such in data directories, as is obvious from the architecture model according to IEC 61131 part 3.

The GIT version control system also implements a cryptographically strong integrity protection in the form of a cryptographic hash value in each case for each version of an individually versioned object, the group of objects together with their metadata, such as object type and object name, which belong to a specific version, and according to the status of the version the commit message, the hash value of the group of objects that belong to the particular version, the hash value of the previous version, and other information, such as the name of the author.

The inclusion of the hash value of the previous version in calculating the hash value of a new version creates an integrity protection for the version history. In addition, the GIT version control system also allows the creation of cryptographically strong digital signatures for hash values of versions, whereby a manipulation protection is created for the particular version together with its version history and that can verify which GIT signatures. To be sure, the disadvantage here exists that an individual must always sign everything.

Thus there are known cryptographic means available for protection of digital data from manipulation in the form of signatures. Digital data are signed in this way, whereby an individual authorized to sign for any data creates a signature and by using a specific means a different party at a later time can test whether the data are so set up as they were at the time of creating the signature. The latter is called authentication of the data. If rapid processing speed is necessary, then as a rule the use of symmetrical cryptography is advantageous, which upon signing and upon authenticating uses the same key, which is also called distributed secrecy.

All the participants in data exchange that can be authenticated must thereby know the same secret. It is true that the symmetrical cryptography can be performed with a lesser calculation expenditure and thereby with higher processing speed. However, a problem exists in maintaining the confidentiality of the secret. The more participants it is known to, the higher the risk that the secret becomes known to unauthorized persons. The distribution of an initial or new secret is an additional problem. Many possibilities of solutions are known. They are not further relevant as part of the invention, outside of their general property that they are quite expensive in terms of organization and/or of the need for calculation. If there are a number of various users, signatures based on asymmetrical cryptography are advantageous, which can be created and tested with a key pair. A private key serves for the creation of a signature and for a related public key service for testing a signature. For the purpose of maintaining the strength of testing, copies of a private key should be made available only in as small a number as possible, and thereby only the particular authorized person can create valid signatures. Ordinarily every person authorized to sign has assigned to him at least his own pair of keys, and every person keeps his key private unto himself, and does not make it available to any other person. In the interaction between persons, asymmetrical signatures have also been set up, and solutions exist in which the particular private key can be saved in a small device or electronic component, so that it is almost not extractable or copyable, but is usable for the creation of signatures and thereby functions in a certain sense similarly to keys for safety door closers. So-called "Public Key Infrastructures" (henceforth PKIs) have been set up for an efficient distribution and testing of public keys. Certificates used in connection with key infrastructures have special meaning. In these, the identities of persons can be confirmed, and the rights and other properties of persons can be noted as well. Attribute certificates are a useful variant of the clarification of such rights and properties.

For example, for the long-term testability of digital signatures a format can be defined, which combines a digital signature with a timestamp and optionally other proofs that the signature already existed at a specific point in time.

For the efficient long-term archiving of digital signatures, for example efficient signatures can be created for many data, in which a tree of cryptographically strong test totals is built and only the roots are signed. Hereby the page nodes of the tree contain cryptographically strong test totals of individual data (or files), and in all the other nodes it occurs that the cryptographically strong test totals are all in test totals that are in consecutively defined form of the directly subordinate nodes. A simple form of such a tree has a root node and any number of page nodes, but no nodes stored in between. This form allows the efficient signature of a number of data (or files), but without prior group formation.

As noted at the beginning, it is possible that several persons or users together work on a development project, such as an automation solution. In this regard it is schematically presented in FIG. 3 how for example software tools such as MULTIPROG Version 5.50 and CodeSys V3.5 are today used within larger organizations, whereby various persons each process their own work copy (work copy 1, 2, up to m) of the same automation solution locally on a workplace computer (System R.1, R.2, to R.m). The same result is stored as a rule in a central repository, for example a server (System Z), so that all the persons of the organization can retrieve the currently valid version of the automated solution from the central repository and can store it there as well. For this purpose the systems (System Z, R.1, R.2, to R.m) are connected with one another at least temporarily through a network not further illustrated in FIG. 3 on grounds of comprehensibility. The server (System Z) can thereby prepare a central storage location for computers and files with or without version administration.

Often collaboration occurs in processing automation solutions even without a general central depository. Hereby the particular current version of the automation solution is directly transferred between the systems of the persons, whereby the persons involved ideally are in agreement for the purpose of a series of processing actions.

Both with and without a central repository, two or several various new versions of an automation solution come into being, which stem from the same or even from different original versions.

Because of the customary storage form of the automation solution, for example in the form of file directories and subdirectories according to the architecture model according to IEC 61131 part 3, conflicts frequently occur, so that changes taken by later overwriting are also in undesired fashion made retroactive, and thereby work is lost or additional work is expended to merge two new competing versions that have been created.

Figure 4:
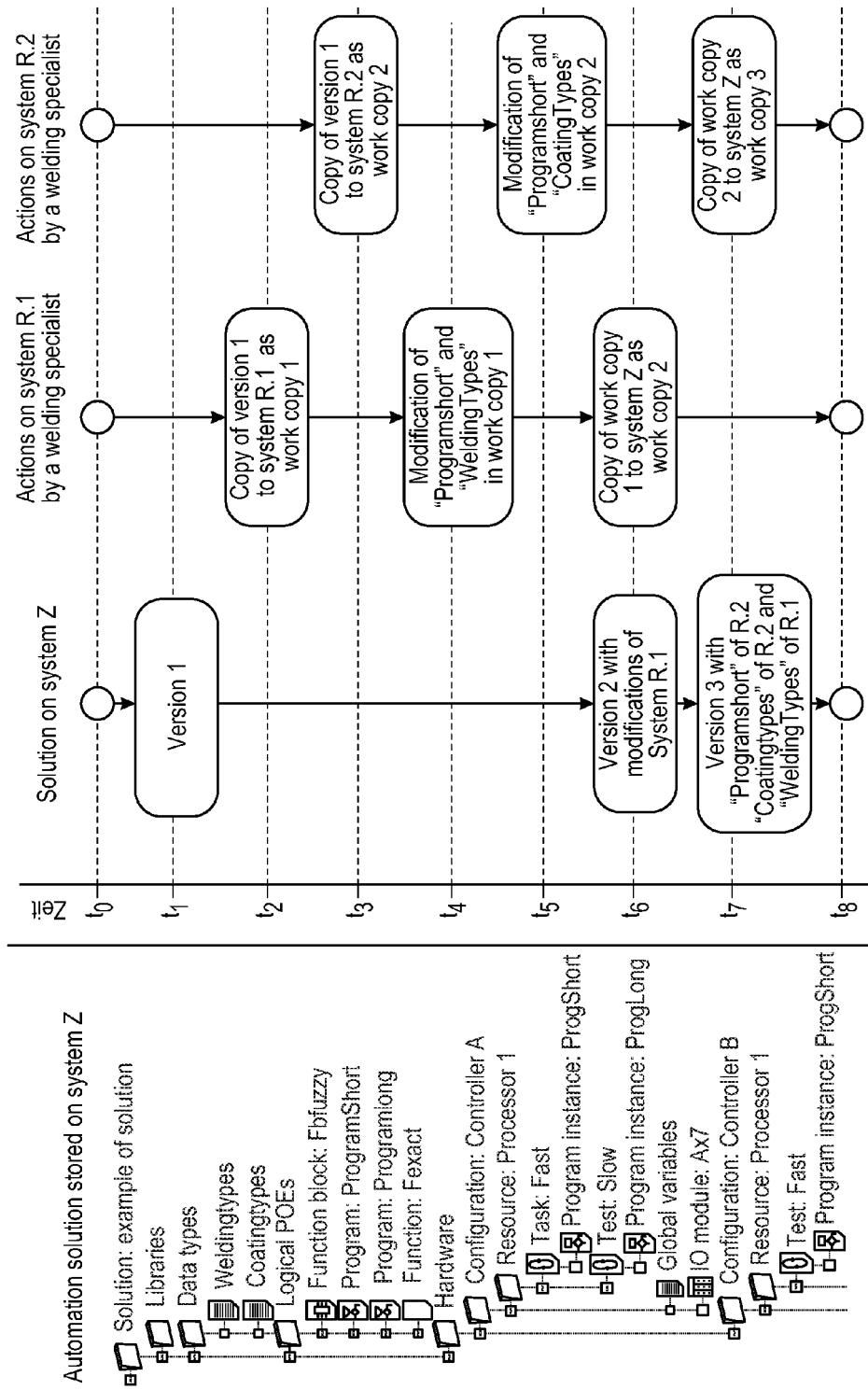
FIG. 4, a schematic presentation of a conflict in the collaboration in processing and automation solution according to the state of the art of technology, in which an undesired overwriting of a change occurs, based on a flow diagram.

An example for an undesirable overwriting of a prior version is illustrated in FIG. 4, where a welding specialist and a coating specialist in contradictory fashion modify the program "ProgramShort" of the automation solution already presented in FIG. 2, whereby at the end of the last procedure copy at time point t7 the change by the coating specialist is stored on the central repository (System Z) as version 3, but thereby is made retroactive in the program "ProgramShort" at time point t6 as version 2 of the stored change of the procedure copy of the welding specialist.

The standard solution for the conflict shown in the example is that the coating specialist integrates the changes of the welding specialist in his already changed version 3 of "ProgramShort".

To be sure, then the painter version stored as version 3 would also include the changes of the welding specialist, for which the coating specialist would possibly not be competent at all.

Very frequently such conflicts occur in connection with the linking table (VKT), which generally is placed in a central position of the automation solution and which must be changed frequently, in particular upon changes of the program.

Above all, based on such overlapping parts of an automation solution, access rules can be set up in any case with difficulty in a simple repository.

The relevance is particularly apparent in the non-recognition of exceeding competence such as in the case discussed in the example, when a safety specialist undertakes changes that must be integrated subsequently with new changes of a safety specialist. Till now automation solutions with safety parts therefore have been strictly separated from non-safety solutions.

Figure 5:
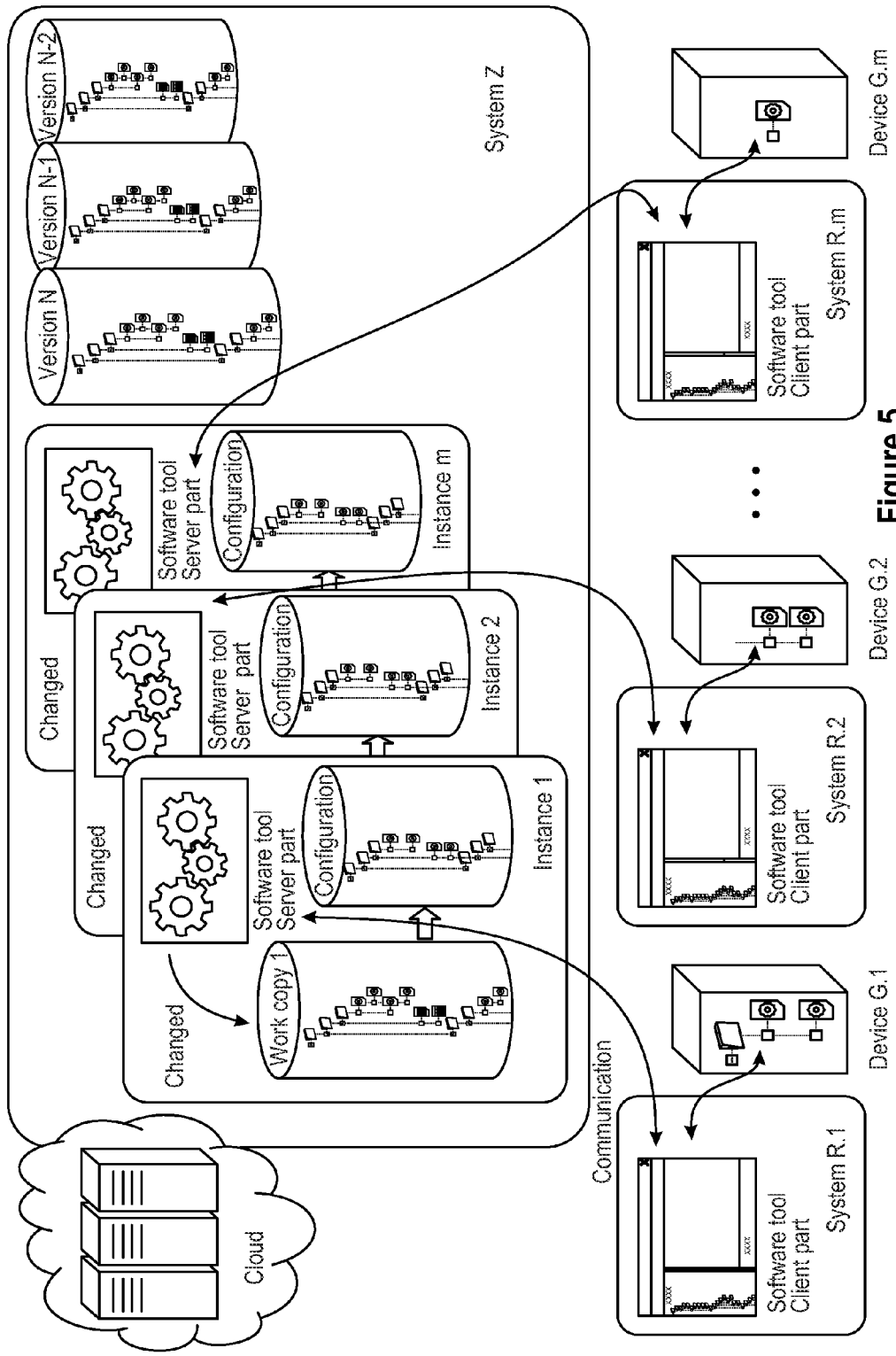
FIG. 5, a schematic presentation of collaboration in processing and automation solution with distributed systems in accord with DE 112013007160 T6 (the state of the art of technology)
Figure 6:
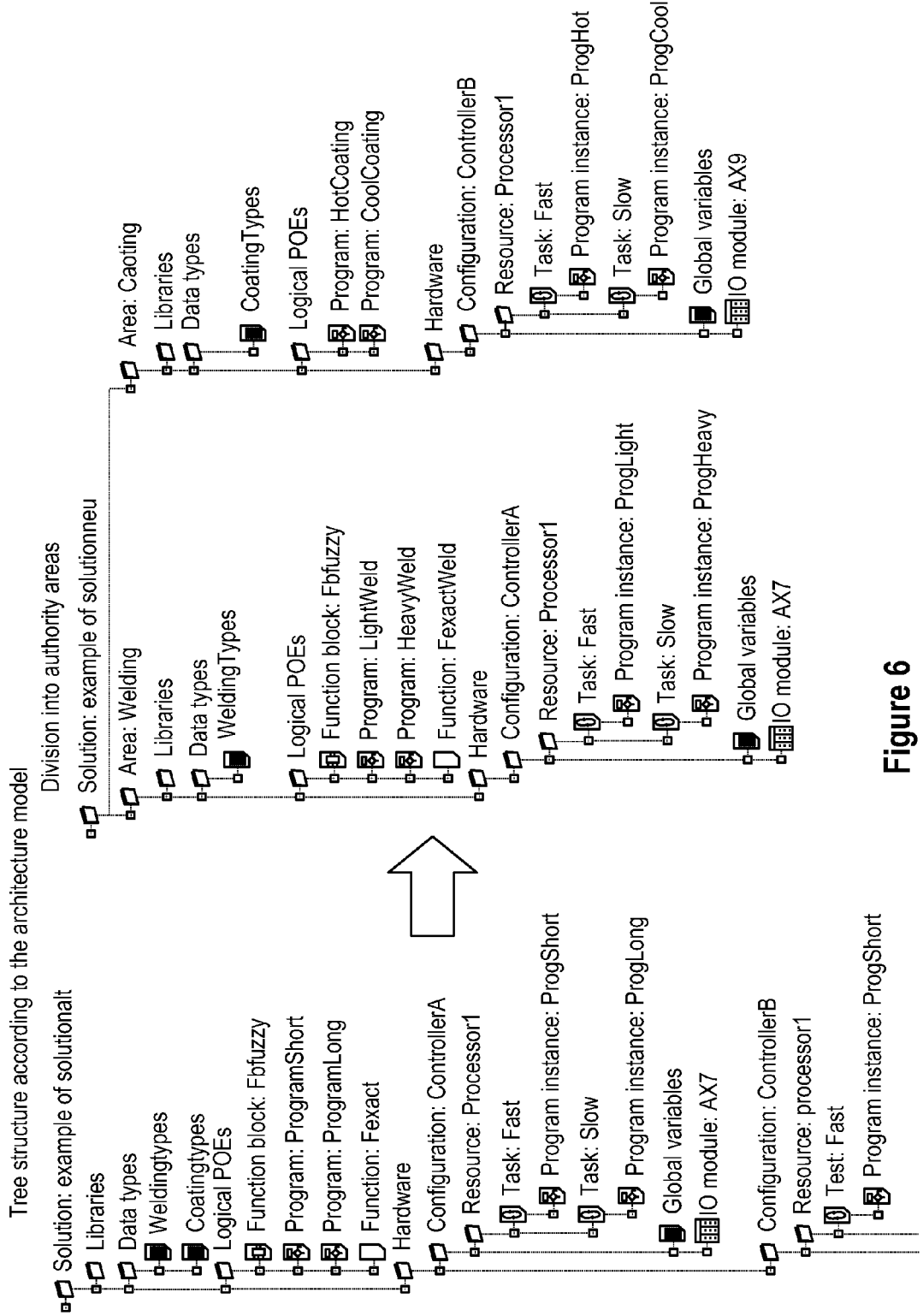
FIG. 6, a schematic presentation of the separation of an automation solution into authority areas.

A further example of the collaboration and processing automation solutions is given by DE 112013007160 T6. The development environment system given there is schematically presented in FIG. 5. Thereby the software tool is divided into a client part and a server part, and is driven in separated fashion on the systems (System Z, System R.1 to R.m). The client part runs only on the workplace computers (System R.1 to R.m), while a server part exists and is driven for each workplace computer on the central system (System Z) as soon as the software tool is activated on a workplace computer. While the client part is of small scope and essentially detects two tasks, the program logic of the software tool is performed on the central system. The two tasks of the client part on the workplace computers are first of all the interaction with the user and the server part of the software tool, for example in the form of presentations and standard service elements of standard graphic user surfaces, and secondly transmitting communication between one or several storage programmable control units (device G.1 to G.m), which can be reached from the workplace computer. It is characteristic in this sort of collaboration that working copies of the automation solution are held only on the central system, not on the workplace computers. Even the configurations that can be created and operational files from the automation solution are created on the central system, and only then transferred after creation to the client part, which extends further to the control units (device G.1 to G.m) that are reachable through the client part. The total administration and performance of the access rights occurs on the central system. This type of development environment system extensively corresponds to a schema that is known from "Cloud Computing" as "Software as a Service" (SaaS). The disadvantage of this above all is the complexity whereby an automation solution on a workplace computer (System R.1 to R.m) can be processed only when there is an existing connection to the central system (System Z).

In the known type of structuring and storage of automation solutions in the form of the hierarchy according to the architecture model according to IEC 61131 part 3, regardless of whether it is in a file with an inner structure in the form of a collection of files with a file directory structure, as occurs in standard software tools for processing automation solutions, the basic problem exists that several users, even when they come from various specialties, often have to process the same parts of the tree, even though they are actually working on separate tasks, which otherwise have few points in common.

This brings about a series of problems and conflicts of which several have already been mentioned above.

In particular it is not possible in many objects of the automation solution, such as individual POEs, cases of POE, or the link table to allocate clear ownership and responsibility for a user. Without such ability to allocate, the possibility also is lacking to be able to ensure and verify the integrity (data can be changed without notice, all changes must be comprehensible) and the authenticity (genuineness, review ability, and trustworthiness) of such components of the automation solution and finally of the automation solution as a whole.

A task of this invention thereby exists to reduce the possibilities of conflict, which till now occur in the processing of development projects by several persons using development environments prepared by development environment systems.

Another set of problems that the invention can deal with in a purposeful embodiment can be seen, when processing development projects by several persons, in being able reliably to recognize authority violations using development environments prepared by development environment systems.

Another set of problems that the invention can deal with in a purposeful embodiment can be seen in the possibility of reliably recognizing and locating impermissible manipulations of the development project data in the processing of development projects, particularly by several persons, of development environments prepared by development environment systems, even if the manipulations of the development project data are undertaken outside the development environment system.

Another advantageous embodiment of the invention in dealing with this set of problems can be seen in the processing of development projects, in particular by several persons, of creating the possibility to use development environments prepared by development environment systems so that the authenticity of the development project data in total and/or the authenticity of individual parts of the development project data can be reliably verified.

Another advantageous embodiment of the invention in dealing with this set of problems can be seen in that the noted recognition of violations of authority and/or of impermissible manipulations and/or the verification of authenticity without knowledge of a secret should be possible, so that secrets do not thereby have to be distributed.

As a solution, the invention proposes in particular a data organization procedure with the characteristics of the independent patent claim 1 and a development environment system with the characteristics of independent claim 24. Further advantageous embodiments of the data organization procedure and development environment system according to the invention are given in the particular dependent patent claims. The characteristics and advantages given for the data organization procedure logically apply as well to the development environment system.

A data organization procedure is thereby proposed in which a set of data that is stored or is to be stored is organized according to a first structure, whereby the set of data is subdivided into partial data sets according to aspects of the content and/or according to aspects of access rights, whereby another structure is planned in addition for the first structure, according to which the data set is organized, whereby the data set is subdivided according to authority areas. Thereby each authority area includes at least one partial data set according to the first structure, and each partial data set includes at least one data unit. In addition, a responsible set of users is allocated to each authority area, whereby the set of users includes at least one user.

Accordingly the user or each user belonging to the user set is allocated to the authority area to which the user set is allocated. The user set allocated to an authority area is designated in the description of the embodiment as an owner group.

Another embodiment of the procedure envisages that the data set include development project data, preferentially data from a software development project and in particular program code and/or configuration data and/or parameter data for an automation unit.

Thereby the first structure can involve in particular a hierarchy of the architectural model according to IEC 61131 part 3, according to which in particular the development project data are subdivided or organized.

Preferentially it is planned for the procedure that a specific data unit be included in only one specific authority area, and/or that at least one user from several user sets is included. Accordingly there is no overlapping of authorities with regard to such data units. However, there can be users that belong to several data sets and thereby are allocated several authority areas. Such a user will below be designated as a diplomate.

Such a data organization procedure and the associated additional subdivision of the stored data sets or data sets to be stored according to authority areas according to another structure already allow a significant reduction of conflict possibilities in processing development projects by several persons.

Another embodiment of the procedure provides that according to the second structure a chief authority area is also prepared, and this is superior to that authority area, so that the chief authority area indirectly includes all the partial data sets included by the authority areas.

Thereby the chief authority area also directly includes that partial data set of the data set that is not included by any other authority area. Each partial data set thereby includes at least one data unit, and an authority chief user set is assigned to the chief authority area, which includes at least one user. Accordingly, every user belonging to the chief user set is assigned to the chief authority area and is so to say a chief user, whereby a chief user possesses thereby directly or indirectly the authority for each data subset or for the entire data set. The chief user set assigned to the chief user area will also be designated in the description of the embodiment as a chief user group.

Another embodiment of the procedure envisages that at least a first set of description information will be allocated to the chief authority area, whereby the first set of description information includes identification information of the chief authority area and/or identification information of the responsible chief user set. Alternatively or additionally it is planned that at least one second set of description information will be assigned to each authority area, whereby the second set of description information includes identification information of the authority area, identification information of the chief authority area, and/or identification information of the responsible user set.

In the noted set of identification information, there may be for example an unambiguous ID or a name for the chief authority area, the chief authority set, and authority area, or a user set. These items of information can for example be included in a description file, which is allocated to the particular area Another embodiment of the procedure provides that at least one link between data units is prepared, whereby a set of blinking information is created for the link, which includes identification information of the link, identification information of the chief authority area, and/or identification information of each authority area involved in the link, and in particular identification information and/or indicator information to each data unit involved in the link.

Thereby indicator information for example can be a reference to a piece of path data to the storage area of the particular data unit. In the case of control software or of an automation solution that is created as part of a development project or that should be processed there, there may be for example variables of the linking data units, which are linked with entries and outputs of POEs or IO modules for linking, whereby the linking information for example is noted in a table. As a rule an automation solution includes a number of such links, and correspondingly many items of linking information are to be administered.

Such linking information can be created and subdivided and or compiled according to the invention in various ways, in particular depending on whether a link exists between data units from the same area or between data units from different authority areas.

In this regard an embodiment of the procedure is planned whereby the linking information is created according to a first variant, whereby each item of linking information is allocated to the chief authority area, and is responsible only for the chief user set for such an item of linking information.

In addition another embodiment of the procedure envisages that the linking information is created according to a second variant, whereby the linking information a) is allocated to the chief authority area, if all the data units involved in the link are included only by the chief authority area, whereby only the chief user set is responsible for such an item of linking information, or b) is allocated to the chief authority area, if all the data units involved in the link are included by the chief authority area and another responsibility area, whereby only the chief user set is responsible for such an item of linking information, or c) is allocated to the chief authority area, if all the data units involved in the link are included by various authority areas, whereby only the chief user set is responsible for such an item of linking information, or d) is allocated to an authority area if all the data units involved in the link are included in this authority area, whereby a user set allocated to this authority area is responsible for such an item of linking information.

In addition another embodiment of the procedure envisages that the linking information is created according to a third variant, whereby the linking information a) is allocated to the chief authority area, if all the data units involved in the link are included only by the chief authority area, whereby only the chief user set is responsible for such an item of linking information, or b) is allocated to the chief authority area, if all the data units involved in the link are included by the chief authority area and to another responsibility area, whereby only the chief user set is responsible for such an item of linking information, or c) is allocated to the chief authority area, if all the data units involved in the link are included by various authority areas, whereby the chief user set or a set of users from these authority areas is each assigned as responsible for such an item of linking information, or d) is allocated to an authority area if all the data units involved in the link are included by only one authority area, whereby the chief user set or the user set assigned to this authority area are responsible for such an item of linking information.

In addition another embodiment of the procedure envisages that the linking information is created according to a fourth variant, whereby the linking information a) is allocated to the chief authority area, if all the data units involved in the link are included only by the chief authority area, whereby only the chief user set is responsible for such an item of linking information, or b) is allocated to the chief authority area, if all the data units involved in the link are included by the chief authority area and by another responsibility area, whereby only the chief user set is responsible for such an item of linking information, or c) is allocated to the chief authority area, if all the data units involved in the link are included by various authority areas, whereby the chief user set or a set of users from these authority areas is each assigned as responsible for such an item of linking information, or d) is allocated to an authority area if all the data units involved in the link are included in this authority area, whereby an allocated user set for such linking information is assigned as responsible for this authority area.

Another embodiment of the procedure envisages that in each case a testing piece of information, in particular a test total such as what is called a hash value, is communicated for at least one first description piece of information allocated to the chief authority area, and/or with regard to each authority area for in each case at least one second piece of information allocated to the particular authority area, and/or for essentially each data unit covered directly by the chief authority area, and/or for each piece of linking information allocated to the chief authority area according to the first or second variant, whereby a chief inventory is allocated to the chief authority area, which includes each piece of test information like this one and for each piece of test information there is an indicator piece of information on the description piece of information of the particular test information or linking information or data unit, and/or that in each case a piece of testing information is communicated for the data unit covered essentially in each case by an authority area, and/or for each piece of linking information allocated to an authority area of the second or fourth variant, whereby an inventory is allocated to the chief authority area, which includes each piece of test information like this one and for each piece of test information there is an indicator piece of information to the underlying linking piece of information or data unit, and/or that regarding this another embodiment of the procedure envisages that in each case an unambiguous piece of test information is communicated for each inventory allocated to a particular authority area, and/or for the inventory allocated to the chief authority area, and/or for each piece of linking information allocated to the chief authority area according to the third or fourth variant, whereby a meta-inventory is allocated to the chief authority area, which includes each piece of test information like this one and for each piece of test information there is an indicator piece of information on the description piece of information of the particular test information or linking information or on the underlying linking piece of information or on the inventory or chief inventory underlying the particular piece of test information data unit.

Another embodiment of the procedure envisages that at least one piece of description information and/or piece of linking information allocated to the chief authority area and/or the chief inventory allocated to the chief authority area and/or the meta-inventory presents another data unit included under the chief authority area, and/or that at least one piece of description information allocated to an authority area and/or linking piece of information and/or inventory allocated to the authority area in each case presents another unit included under this authority area Consequently, there can appear for example a piece of description information, a piece of linking information, a chief inventory, a meta-inventory, or an inventory of an authority area in each case in the form of a file, which then is included by the chief authority area or an authority area, whereby in particular for files with pieces of description information or pieces of linking information it can be planned to communicate a piece of test information, and this piece of test information and piece of indicator information can be received into the particular file in a chief inventory, meta-inventory, or inventory of an authority area.

Preferentially it is planned for the procedure that the data set be saved principally according to the additional structure. This means that the additional structure takes precedence over the first structure. Thus a directory is set up for storing the data set for example initially for that authority area according to the additional structure, and only below or with in this computer are the data sets or data units stored according to the first structure. Or if for example the total data set is stored in a file, initially on the highest hierarchical level a node is set up for that authority area according to the additional structure, and only under or within this node are the partial data sets or data units stored on the second hierarchical level according to the first structure.

Another embodiment of the procedure envisages that for each user who is included by at least one user set that is allocated to an authority area, and/or who is included in the chief user set that is allocated to the chief authority area, an unambiguous item of signature information and an unambiguous piece of appropriate verification information associated with it is allocated.

In the signature information there may be set up for example a digital private signature key and in the verification information a digital public verification key, which together form a pair of keys for asynchronous cryptography.

In this regard, another embodiment of the procedure envisages that if there is a writing access to a data unit, signing of this data unit occurs, in which a piece of monitoring information is communicated and allocated to this data unit for this data unit to be stored with inclusion of the signature information that is allocated to the user who initiates the writing access. This piece of monitoring information involves in particular a digital signature. A piece of testing information is initially preferred for the data unit to be stored, for example a hash value, established for this piece of testing information by importing the signature information that is allocated to the user initiating the writing access, and that confirms this monitoring information and allocates and in particular adds this data unit.

In addition, another embodiment of the procedure envisages that when there is writing access to a data unit for which a test total is included by an inventory, by the chief inventory, or by the meta-inventory, signing of the data unit occurs in a way that a new piece of testing information is established for this data unit that is to be stored, the piece of testing information for this data unit that is included by the inventory, the chief inventory, or the meta-inventory is replaced by the newly established piece of testing information, and instead of this data unit replacing the inventory, the chief inventory, or the meta-inventory, which includes the newly established testing information for this data unit by importing the signature information that is assigned to the user initiating the writing access, a piece of monitoring information is established and this is assigned to this inventory, chief inventory, or meta-inventory. Thereby in an advantageous manner with only one piece of monitoring information, for example a digital signal, equally several or all relevant data units are signed to an authority area. As a rule this is quicker than establishing a piece of monitoring information for each individual data unit, and pays off in particular when only one data unit or just a few data units are changed.

The digital signing of the authority areas or of important data units of the authority areas creates the precondition for recognizing violations of authority and manipulation, and enables the verification of the integrity and authenticity of development projects in total or in parts. Here the invention envisages further preferred embodiments of validity monitoring.

In addition, another embodiment of the procedure envisages that upon signing, the piece of monitoring information is established through the additional import of a piece of time information. This allows even safer validity monitoring.

In addition, another embodiment of the procedure envisages that a validity monitoring takes place upon the initiation of a request of a user or of a reading or writing access that takes place within a predetermined time span on at least one data unit, whereby the positive or negative result of the validity monitoring is indicated.

In addition, another embodiment of the procedure envisages that in particular in a first step, for the chief inventory allocated to the chief authority area the validity of the piece of monitoring information allocated to the chief inventory by importing at least one piece of verification information is monitored, whereby a positive result is achievable only through a piece of verification information that is allocated to a user, who belongs to the set of chief users, and/or that for the chief inventory allocated to the chief authority area the validity of each of the pieces of indicator information included by the chief inventory is monitored, in that the existence of the time given data unit is monitored by the particular piece of indicator information, whereby a positive result is achievable only when the data unit given by the indicator information is available, an/or that for the chief inventory allocated to the chief authority area the validity of the testing information included by the chief inventory is monitored, in that the testing information for the data unit entered by the particular indicator information, and the newly calculated test information is compared with the test information contained in the chief inventory, whereby a positive result is achievable only when the newly calculated test information agrees with the testing information contained in the chief inventory.

In addition, another embodiment of the procedure envisages that in particular in a second step, for the meta-inventory allocated to the chief authority area the validity of the piece of monitoring information allocated to the meta-inventory by importing at least one piece of verification information is achievable, which is allocated to a user, who belongs to the set of chief users or belongs to a user set that is allocated to one of the authority areas, and/or that for the meta-inventory allocated to the chief authority area the validity of each of the pieces of indicator information included by the meta-inventory is monitored, in that the existence of the data unit entered by the particular indicator information is monitored, whereby a positive result is achievable only if the data unit entered by the indicator information exists, and/or that for the meta-inventory allocated to the chief authority area the validity of each of the pieces of testing information included in the meta-inventory is monitored, in that the testing information is calculated anew by the data unit entered by the particular indicator information, and the newly calculated testing information is compared with the testing information included in the meta-inventory, whereby a positive result is achievable only when the newly calculated testing information agrees with the testing information included in the meta-inventory.

In addition, another embodiment of the procedure envisages that, in particular in a third step, for each inventory allocated to an authority area, the validity of the monitoring information allocated to the inventory by importing at least one piece of verification information is monitored, whereby a positive result is achievable only by a piece of verification information that is assigned to a user who belongs to the set of chief users or belongs to the user set that is allocated to the same authority area that is allocated to this inventory, an/or that for each inventory allocated to one authority area the validity of each of the pieces of indicator information included in the inventory is monitored, in that the existence of the data unit entered by the particular indicator information is monitored, whereby a positive result is achievable only when the data unit entered by the indicator information exists, and/or that for each inventory allocated to an authority area the validity of each of the pieces of testing information included by the inventory is monitored, in that the testing information for the data unit entered by the particular indicator information is calculated anew, and the newly calculated testing information is compared with the testing information included in the inventory, whereby a positive result is achievable only when the newly calculated testing information agrees with the testing information included in the inventory.

In addition, another embodiment of the procedure envisages that, in particular in a fourth step, for each further data unit included in the chief authority area, which possesses an assigned piece of monitoring information, the validity of this monitoring information is monitored by importing at least one piece of verification information, whereby a positive result is achievable only through a piece of verification information that is assigned to a user, who belongs to the set of chief users or to a set of users that is responsible for this data unit, if this data unit is a piece of linking information according to the third or fourth variant, an/or that for every additional data unit included by a particular authority area, which possesses an allocated piece of monitoring information, the validity of this monitoring information is monitored by importing at least one piece of verification information, whereby a positive result is achievable only through a piece of verification information that is allocated to a user who belongs to the set of chief users or belongs to the set of users that is allocated to the same authority area that also includes this data unit.

It is further expedient to test whether more data units are included than exist in any inventory, because unprotected and unsigned data units, in so far as they are relevant, may not exist.

The digital signing of the authority areas or of important data units of the authority areas and the monitoring of the validity of the digital signatures ensure the reliable recognition of violations of authority and manipulation, and ensure the verification of the integrity and authenticity of development projects in total or in parts.

In addition, another embodiment of the procedure envisages that in particular by each of the four steps described above, upon monitoring of the validity of a piece of monitoring information that is established by additional import of a piece of time information, a positive result of the monitoring of validity is achievable only through a piece of verification information that is allocated to a user, who, in the time period noted in the case of time information, belongs to the set of chief users, or belongs to a user set that is allocated to one of the authority areas, in so far as this monitoring information is allocated to the meta-inventory, or belongs to the set of users that is allocated to the same authority area to which the inventory is also allocated, and to which this monitoring information is allocated, or belongs to the set of users that is responsible for the data unit that is allocated to this piece of monitoring information, in so far as this data unit is a piece of linking information according to the third or fourth variant, or belongs to the set of users that is allocated to the same authority area that also includes the data unit that is allocated to this piece of monitoring information.

The import of a piece of time information into the digital signature once again increases the reliability, since thereby a subsequent validity monitoring for a signature can make clear whether a user at the time of the signing was actually a member of the responsible set of users. This is particularly advantageous if development projects last over long periods of time, during which a certain fluctuation of users and authorities can occur throughout the project.

Another embodiment of the procedure envisages that when there is writing access to a set of partial data or to a data unit, a new version of this set of partial data or data unit is stored.

In addition, a development environment system is proposed that is set up to perform the data organization procedure described above, including a storage device, an input-output device, and a processing device, whereby a data set is stored in the storage device, which includes the development project data, and whereby a development environment is stored in the storage device, whereby the development environment, when the processing device is in use, controls the storing of the development project data in the storage device in conformity with the data organization procedure and controls the preparation of a user interface for working on the development project on the input-output device.

In a very simple example, the development environment can thus be represented as it moves through a correspondingly set up workplace computer or laptop.

According to another embodiment of the development environment system, it is envisaged that it includes several development environment devices, each of which has a storage device, an input-output device, and a processing device, and that in each case includes a communication device that at least over time can be coupled to a network and that can communicate with each other. Thereby the first of the development environment devices functions as a development environment server, in which storage device the development project data are centrally stored, and at least one other development environment device that functions as a development environment client, which can access the centrally stored development project data in particular by reading and/or writing.

According to another embodiment of the development environment system, it is envisaged that that the development environment is stored centrally in the storage device of the development environment server, whereby the development environment client can access the centrally stored development environment.

Thereby the development environment includes a development environment server unit that can work through the processing device of the development environment server, and a development environment client unit that can work through the processing device of the development environment client. The development environment unit and the development environment client unit can work together in particular through the network. Thereby, through the action of the processing device of the development environment server, the development environment unit manages at least the storage of the development project data on the storage device of the development environment server, while the development environment client, through the action of the processing device of the development environment client, manages at least the preparation of the user interface for working on the development project on the input-output device of the development environment client.

The development environment server can thereby be as well be prepared for example through cloud computing.

Alternatively to this, the development environment system can also include only two or more equivalent development environment devices, such as two correspondingly set up workplace computers, which do not work together as client and server, but which can communicate with one another over a network, in order for example to transfer the development project data or at least a part of these data in a specific working status from one development environment device to the other.

For example, the development environment system may also include at least a device of an automation unit, which can communicate with at least one development system device via a network, whereby the development project data include program code and/or configuration data and/or parameter data for at least one device of the automation unit, and whereby the development project data are transferred from the development environment device to a device of the automation unit, which programs the transfer development project data and/or configures these and/or sets their parameters.

In another embodiment of the development environment system, it is envisaged that the development environment manages the storage of the development project data in the storage device in such a way that the before writing a data unit included in the development project data to the storage device, at least one valid monitoring occurs that matches the data organization procedure, whereby the writing of the data unit to the storage device occurs only with a positive result of the valid monitoring.

FIGS. 1 to 5 were initially discussed in connection with the state of the art of technology, so that subsequently at the most mention was made of these individually. The present invention will be discussed now more specifically based on FIGS. 6 to 12.

The invention was developed based on the initially presented problems and disadvantages of existing development environments and software tools for the creation and processing of automation solutions. However, it soon became clear that the data organization procedure according to the invention for a data set to be stored or already stored as well as for the development environment system, which performs this data organization procedure, can be usable and useful not only for the development of management software for automation units, but also for the creation and processing of software projects in general and beyond that for other development projects, especially when during the development project there is collaboration among several persons or users.

However, for further discussion below of the data organization procedure and development environment system according to the invention, the example of the use of the development of automation solution and of management software for automation units will be continued.

A development environment system according to the invention that is set up for performing the data organization procedure according to the invention is not shown explicitly in the figures. In a very simple example, it can include a single development environment device, such as a workplace computer that is outfitted with a storage device, an input-output device, and a processing device.

Thereby, first of all in the storage device there is a data set that includes development project data, and in addition a development environment or a software tool is stored, which upon operation by the processing device, manages the storage of the development project data in the storage device according to the data organization procedure according to the invention and manages the preparation of a user interface for working on the development project at the input-output device.

Figure 3:
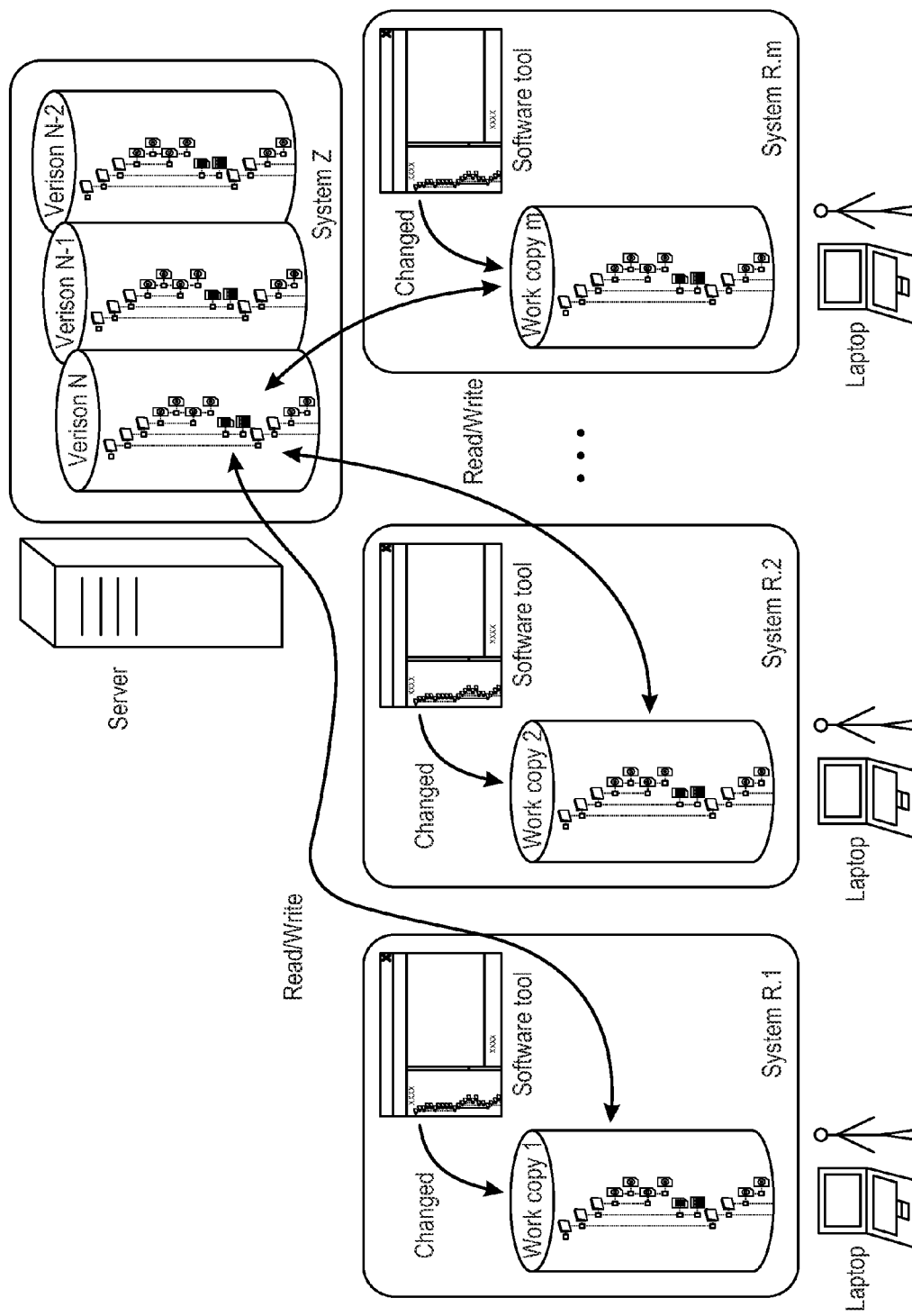
FIG. 3, a schematic presentation of collaboration in processing and automation solution with distributed systems in accord with the state of the art of technology.

In another example, a development environment system according to the invention can be so configured as in the system of the state of the art of technology shown in FIG. 3.

This means that the server shown in FIG. 3 (System Z) can correspond to a system development server and the workplace computer (System R.1, the R.2, to R.m) shown in FIG. 3 can correspond to a development environment client of the development environment system according to the invention, which could communicate with each other over a network not further presented in FIG. 3 for reasons of comprehensibility. The development environment server thereby stores a data set including development project data in a storage device not shown and a development environment including a development environment unit and a development environment client unit. The development environment client can access both the development logic data and the development environment Through a processing device of the development environment server that is not shown, the development environment unit can be operated and the development environment client unit can be operated through a processing device that is not shown of the development environment client. The development environment unit and the development environment client unit can thus work together through the network. Thereby, through the action of the processing device of the development environment server, the development environment unit manages at least the storage of the development project data on the storage device of the development environment server, while the development environment client unit, through the action of the processing device of the development environment client, manages at least the preparation of the user interface for working on the development project on the input-output device of the development environment client. It is also possible that each one of several development environment clients with their processing devices work each on a development environment client unit, so that the particular user interface for working on each of the development project stands ready on each input-output device of each of the development environment clients.

An essential aspect of the invention lies in the reorganization of the structure of a stored data set or a data set to be stored, such as the development project data of an automation solution, and in the creation of a strict distribution of the data sets to authority areas. Thereby the authority areas present non-overlapping areas, and as a result an unambiguous set of responsible persons or users can be allocated to each authority area. Thereby many conflicts that till now have occurred in collaborative creation and processing of automation solutions will no longer arise.

Another essential aspect of the invention is the securing of each individual authority area or least one of the particular partial data sets of the particular authority area against unauthorized manipulation by asymmetrical digital signals that are applied or after processing are renewed by responsible persons or users, meaning those who belong to a user set allocated to a particular authority area.

This allows the recognition of the authority violations and manipulations, and allows the verification of the integrity and authenticity of partial data sets or the entire data set without the user having to share a secret for this, for example a password.

In place of the exclusive organization of the storage structure according to the architecture model of IEC 61131 part 3, an organization based on authority areas explicitly defined by the user appears in a superior place. Each authority area can include any elements of the architectural model according to IEC 61131 part 3. The elements may also be organized according to the known architectural model by a logical link, but the organization of the storage structure will occur principally according to the authority areas. Actually, each authority area will thus contain only one part of the automation solution and thereby as applicable only parts of that tree structure defined by the architectural model of a complete automation solution.

If an automation solution follows as the collection of files with their organization in directories, then it makes sense for example for the use of the distribution according to authority areas to define a directory in group order of the stored automation solution according to authority area, and only under that to continue with a structure according to the hierarchy of the architectural model according to IEC 61131 part 3. An example of this is given in FIG. 6. Here a conventional automation solution is divided into two authority areas. One authority area deals schematically with welding, while the second authority area contains all the elements for coding. It is conceivable that another authority area could be set up, in which the jointly necessary elements for welding and coating could be accommodated. For example, this makes sense if such cross-section functionality actually exists and can be set apart. Not all conceivable variants are presented with the example. In particular it is not necessary that authority areas such as "vertical" be divided according to process steps (first welding, then coating). It would also be conceivable that a "horizontal" division could be made according to current technology, for example, if a work group is specialized in visualization, and the visualization panel is programmed both for the welding procedure and for the coding procedure. Mixtures of "horizontal" and "vertical" separation are conceivable and reasonable, depending on the distribution of expertise in various work groups. Increasingly automation solutions are also including components that are not encompassed by the architectural model according to IEC 61131 part 3. This is also reasonable for the distribution according to authority areas.

Furthermore, the invention envisages that one person or one user is allocated as the owner for each authority area. The allocation of an owner group instead of an individual owner makes sense to enable working together. In what follows a team as well as an owner group will be referred to. A team can have any number of persons or users, and in a special case one person and thereby exactly one owner. Furthermore, even one owner group or one team will be allocated to the automation solution.

For a better distinction of owner groups of other authority areas, the owner group allocated to the automation solution in the discussion below, the owner group allocated to the automation solution is also called the chief owner group and the authority area allocated to it as the chief authority area.

The chief owner group can also include any number of persons or users. The allocation can for example in each case be left in the directory of the authority area or, for the automation solution, in the root directory of the solution.

Actually the allocation of an owner group to the automation solution as a whole is a more reasonable first step in creating and setting up an automation solution. This must occur at the latest at the time of dividing an automation solution into authority areas. This is because in this way an organizational task division occurs, which prevents any number of users or persons within an automation solution from changing authority areas and responsibilities. The persons belonging to the owner group of the entire automation solution should preferentially be such persons who are sufficiently independent within the organization (e.g., of the company or the institution) that creates the automation solution, for example in that they have authority to give instructions and the power of decision-making in matters of the automation solution.

Figure 7:
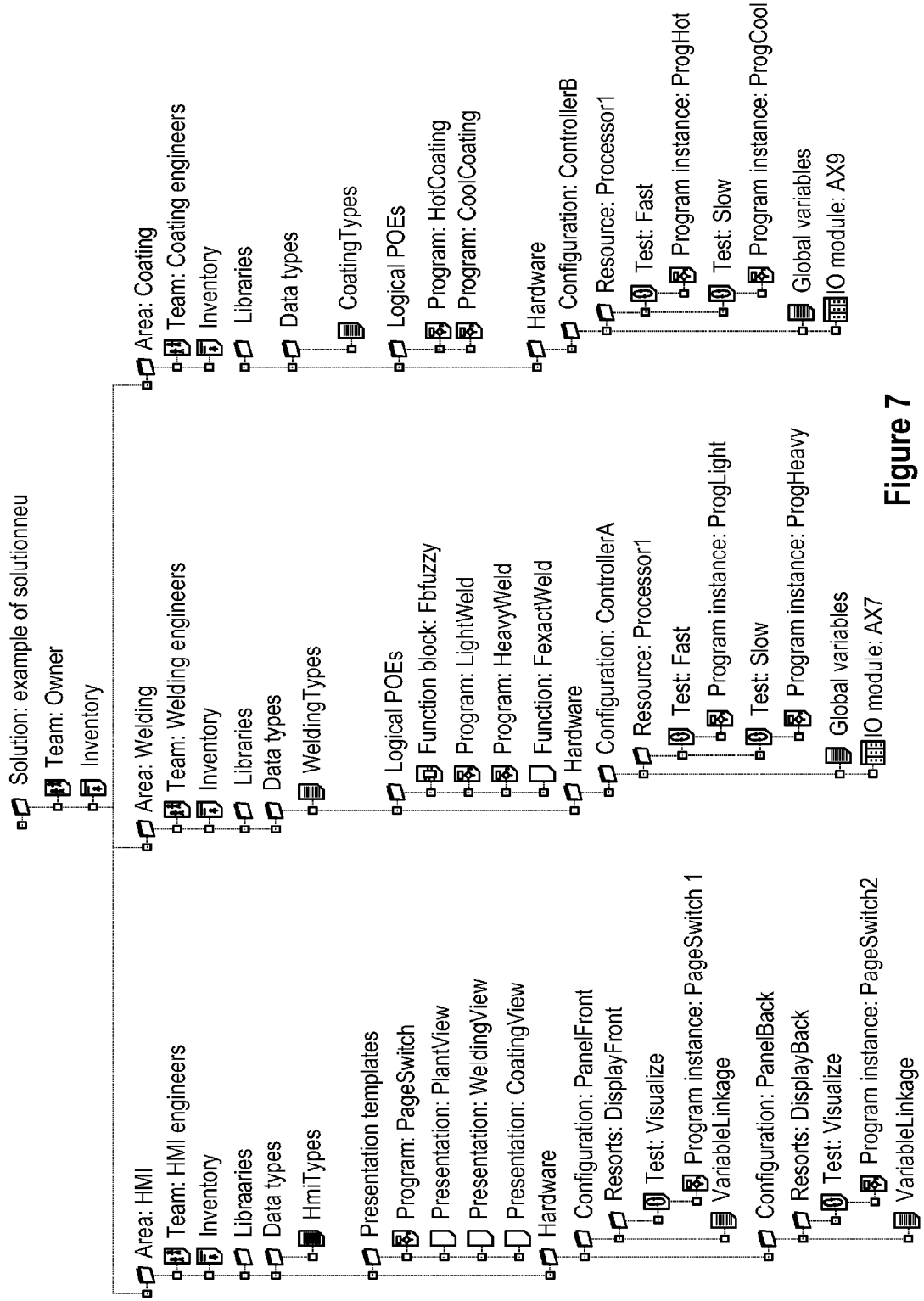
FIG. 7, a schematic presentation of the allocation of teams to the authority areas within an automation solution.

FIG. 7 shows an example of the allocation of teams within an automation solution. The team "owner" is allocated to the automation solution named "BeispielLösungNeu" [example of solutionneu]. The team "HMI Engineers" is allocated to the authority area "HMI"; the team "Welding Engineers" is allocated to the authority area "Welding"; and the team "Coating Engineers" is allocated to the authority area "Coating". FIG. 7 shows the allocation of a team to an authority area for example through files, meaning that within the root directory of the automation solution corresponding to the chief authority area there is a file for allocating the team "owner", and a subdirectory is allocated for each authority area in which there again is a file in each that defines which team is allocated to this authority area. The allocation of the team to the chief authority area and to the authority areas can also occur in another way, for example together with other values of a description file for the particular area.

It is conceivable that the data set of the directory tree presented in FIG. 7 together with the files is contained in a single structured file, for example within a compressed file in ZIP file format. It is also conceivable that the definition of authority areas and the allocation of teams occurs in a single file, which is set up directly in the root directory of the automation solution.

The concrete form of the allocation of the team can take many shapes. For example, it is possible that a file that defines the allocation means all the users or persons who belong to the team. Alternatively, it is possible that within the storage of an automation solution is referenced only based on a name, and the actual list of the persons belonging to the team is available outside the automation solution, such as in a designation service like an LDAP server. The allocation of individual persons to teams using an attribution certificate appears to be very well-suited. This means that the designation service stores a certificate for each person or each user, whereby in the certificates the name of at least one team of the automation solution is entered, of which this person should be a member.

It is advantageous in the storage of automation solutions according to the invention that distinct teams work on distinct areas of the automation solution and thereby can undertake changes that are extensively free of conflict in distinct areas.

Conflicts thereby occur only when within the team overlapping changes are undertaken at the same place at the same time. In practice, this is of lesser significance, because usually within a team during the normal working day regular agreements on the organization of work occur, and in this way conflicts are in a convincing manner automatically avoided.

As already explained at the start, the VKT is a central component of an automation solution, and cannot be allocated as a whole to a concrete authority area, and not to an automation solution with the reorganized structure clarified by the invention. This is because the characteristic of the linking table is that of a matrix, which defines which variables of an automation solution are linked to which inputs and outputs. Inputs and outputs can be those of POEs or for example belong to IO modules, field devices, or remote IOs.

Figure 9A:
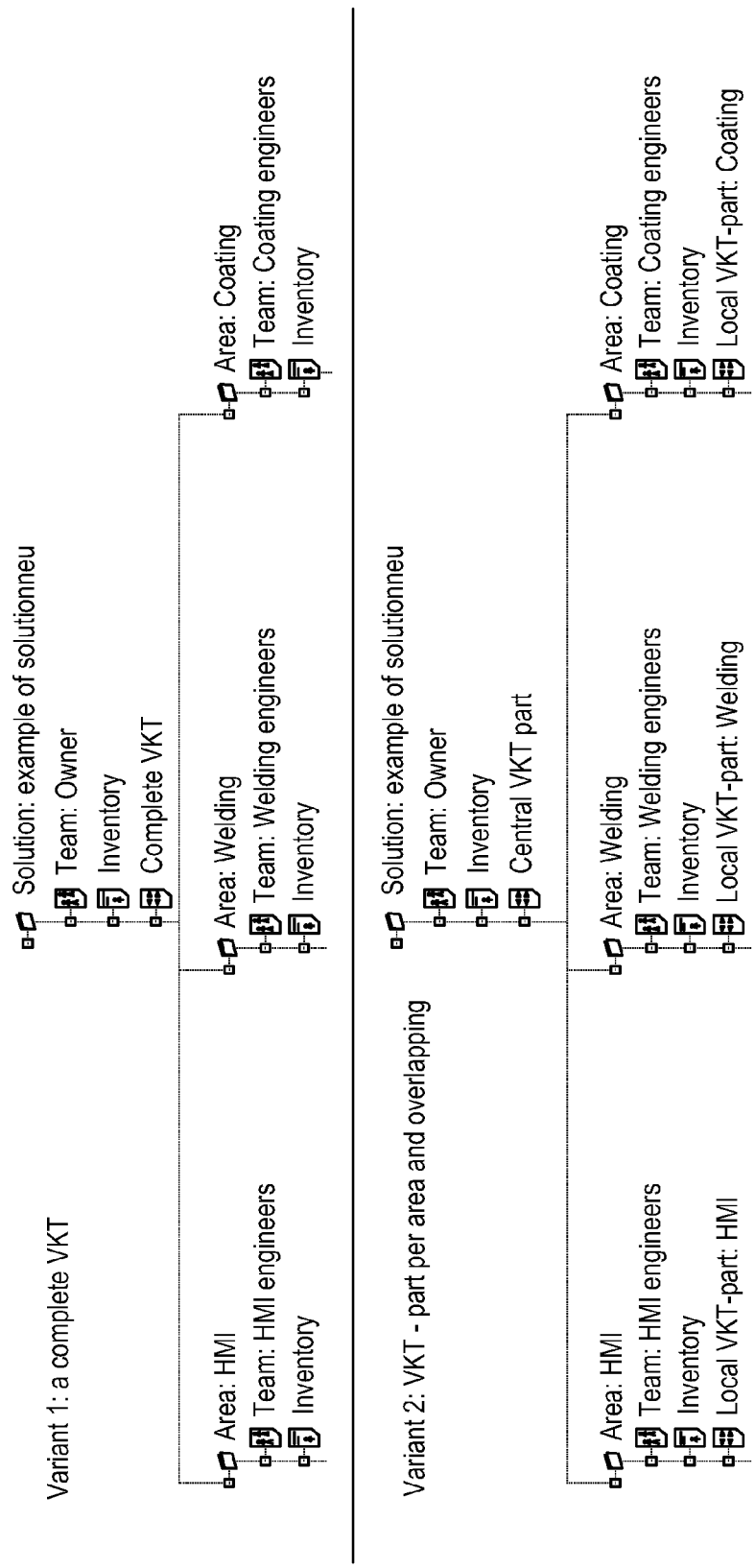
FIGS. 9A and 9B, a schematic presentation of possible variants of the distribution of the linking table (VKT) and the allocation of the VKT parts to a specific authority areas within an automation solution.
Figure 9B:
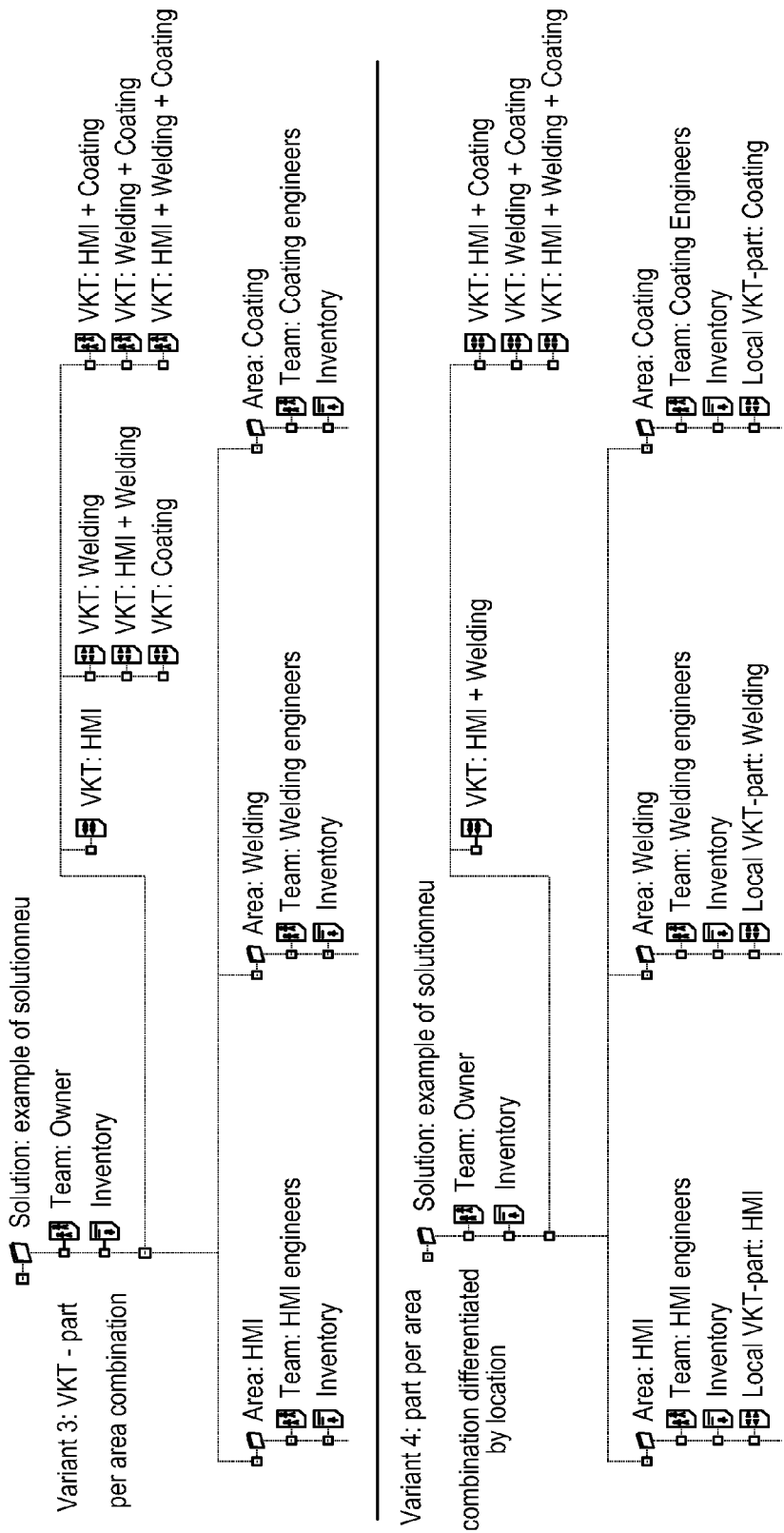

Since according to the structure of the automation solution according to the invention inputs and outputs as well as POEs and resources can be ordered in any authority areas, links according to VKT must be possible between different authority areas. FIGS. 9A and 9B show four possible variants of the distribution of the linking table (VKT) of an automation solution and the allocation of the VKT parts to specific authority areas.

A first variant envisages allocating the VKT centrally, meaning in the chief authority area of the automation solution, for example, as a file in its root directory. So that work can be accomplished here without conflicts, it makes sense that the care of these links is transferred to the members of the chief owner group. This variant corresponds extensively to the state of the art of technology. What is new is the assignment of the responsibility to a chief owner group.

A second variant envisages that the VKT is assigned to a central VKT part, and each additional VKT part is assigned per authority area of the automation solution. The links are exactly defined in the central VKT part, which must be created and administered between variables and inputs and outputs of various authority areas. The links are defined exactly in the VKT of an authority area, which must be created and administered between variables and inputs and outputs within this authority area. In this variant, the number of conflicts in creation and administration of links is reduced because the authority for a specific part of the VKT lies in the particular team of the relevant authority area. The complex handling of procedures here constitutes a challenge to the administration of the parts of the VKT, in which a link must be migrated between the parts by changing the participating inputs and outputs or by changing the concerned variables. They must then in a first step be removed from a part of the VKT and in a second step added to the other part of the VKT. If necessary, the steps must be carried out by different persons in order to maintain the principle of strict division of responsibility.

A third variant envisages that the VKT is divided into many parts, so that a part of the VKT exists for each combination of the authority areas affected by the link. This is the case in a number of N authority areas $2^N-1$ VKT parts. The authority of each VKT part is then so defined that each VKT part may be changed by a user, who is either a member of the chief owner group or a member in all teams of all the authority areas affected by the VKT part. Persons who are members of several teens can be designated as diplomates in analogy to the principle of strict division of authority. In this variant, the number of possible conflicts is strongly reduced while to be sure the complexity of the handling increases and thereby the expense for the implementation of a user-friendly software tool. Actually this variant supports the natural workflow in larger organizations, and there allows a very good division of labor.

A fourth variant refines the third variant in a form that the parts of the linking table, which belong to a combination of exactly one authority area, in each case are stored in this authority area. This variant is also given as an example below with FIGS. 9A and 9B.

It is certainly possible through the division of a stored automation solution in authority areas without overlapping to implement asymmetrical digital signatures for recognition of unauthorized manipulations and thereby to serve for manipulation protection. For this purpose the invention envisages that all relevant data of the authority area per authority area of a person authorized to sign or of a user authorized to sign will be signed digitally. A person authorized to sign for an authority area is the member of the team who is allocated to the authority area, and as a rule also that person who is a member of the chief owner group.

In addition, the invention envisages that the division of the automation solution into authority areas and the allocation of the team by a member of the chief owner group must be asymmetrically digitally signed, including all relevant data that are of central significance for the automation solution, meaning that they cannot be allocated unambiguously to an authority area.

Which team of the owner groups is appropriate is something that is logically assigned outside the automation solution, for example by an attribute within the certificate of the public key of the particular group members.

Alternatively, this information for example can be maintained in the configuration of the installation of the software tool for the administration of the automation solution.

It is envisaged that the software tool for creation and administration of automation solutions authenticates these when they are written or processed with the software tool. Moreover, the software tool should appropriately inform or warn the user about the success or lack of success of the authentication. In particular the software tool thereby tests whether the necessary signing authority for the particular signatures exists, in that it tests the membership of the particular assigning persons in the allocated team.

An advantageous form of the technical realization of the manipulation protection has already been shown in FIG. 7.

There a signed inventory in the form of a file in the directory is presented in a central location for the automation solution. Furthermore, according to the authority area of the automation solution, a signed inventory is presented, which is located analogously as a file within the directory of the particular authority area. Principally, the inventories could be placed elsewhere; it is simply their division that is important for the extensively conflict free cooperation and for the unambiguous allocation of signing authority. What is meant here by a signed inventory is that a list of cryptographically strong test totals of relevant data of an authority area is signed as a group, meaning a private signature key allocated to a team member is established on the list of cryptographically strong test totals of relevant data. This is thereby an efficient means to be able to create relatively quickly a new signature after a small change of data within an authority area or at the central location of the automation solution. The invention here basically refers back to the principle of a test total treat. For a better distinction of the inventories from other authority areas, the inventory allocated to the automation solution in the following is also called the chief inventory.

Figure 10:
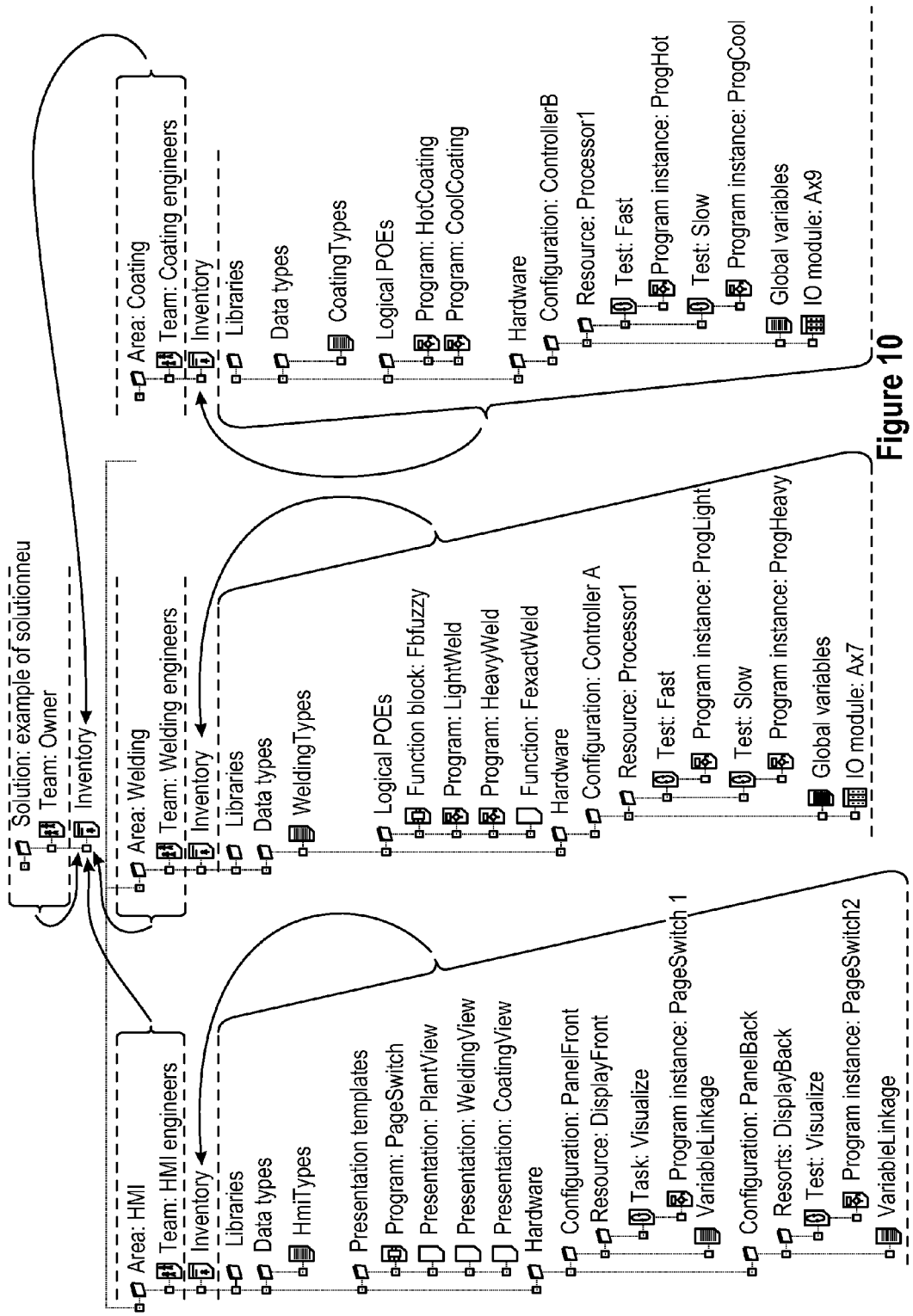
FIG. 10, a schematic presentation of the relationships of the data units to the inventories or to the chief inventory within an automation solution.

FIG. 10 shows the relationships of the data units to the inventories and the relationships of other data units to the chief inventory. The same automation solution is shown as in FIG. 7. In addition, in FIG. 10 data are summarized in curly brackets, and each one allocated precisely with arrows, through which they are protected against unauthorized manipulation.

Here it is to be observed that central properties of the automation solution such as the name and the allocation of the chief owner group are also protected by an inventory signed centrally by a member of the chief owner group, meaning the chief inventory. Recognizably the chief inventory thereby does not include the inventories of the authority areas. Otherwise the problem might arise that through a change in one area that brings about a change in the related inventory, a change in the chief inventory would be necessary, and its signature would no longer agree, so that the end effect would be that only one user of the chief user group could make changes.

Not illustrated in FIG. 10 but essentially necessary for full protection is a situation whereby all inventories include in the digital signature singular and unambiguous properties of the automation solution. For example, the automation solution may have as a central attribute a randomly created identity (ID) that is very likely to be globally unambiguous, and this can be included in the digital signature for the inventory. In this way it becomes almost impossible for an unauthorized person to assemble new or approved combinations of automation solutions that are not actually signed by an authorized person by switching inventories or complete authority areas of valid but different automation solutions. Such manipulations can then be recognized because the references do not match the identities.

In principle an inventory can be of any shape. It is only important that the entire status of all relevant data of an authority area of an automation solution be included with the help of the digital signature that is established for the inventory. Analogously, this applies also to the central relevant data of the chief authority area of the automation solution whose status must be included with the help of the digital signature of a chief owner that is established for the chief inventory. Otherwise it will be possible for an unauthorized person to replace parts of the automation solution, for example through a validly signed old status.

Other details of the inventories will be discussed later based on FIGS. 11A and 11B.

For the four variants described above of the division of the VKT, the manipulation protection according to the invention is implemented as follows.

For the first variant, the single centrally allocated and complete VKT is taken up in the chief inventory, which is signed by a member of the chief owner group.

For the second variant, the central VKT part, which includes links between authority areas, is taken up into the chief inventory, which is signed by a member of the chief owner group. All other VKT parts are each taken up in the inventory that belongs to the specific authority area.

For the third variant, the individual parts of the VKT are each signed directly by that user who has most recently changed the VKT part. Those who are authorized to sign are those who have been declared diplomates, meaning persons or users who are members in all authority areas in the relevant team that are affected by the VKT part. These VKT parts are however not taken up in one of the inventories explained till now, but in what is called a meta-inventory, which is later discussed more specifically on the basis of FIG. 12.

For the fourth variant, the manipulation protection can be implemented in the same way as for the third variant. Alternatively, however, the possibility exists that because of the special location of specific parts of the VKT in a concrete authority area, those parts are taken up into the inventory of the particular authority area, so that they are secured for the inventory through the signature.

In the manipulation protection for automation solutions according to the invention that has been explained above, based on asymmetrical signatures, there still exists the danger that separately signed parts of the same automation solution could be exchanged through other validly signed versions of these parts by unauthorized persons without these being recognized by a software tool. This lies in the fact that no cryptographically strong connection exists either between the individual authority areas or between the authority areas and the central data of the automation solution. This is obvious on the example of FIG. 10. The inventories of the individual authority areas are in no way cryptographically connected to one another or connected with the chief inventory of the automation solution. For the time period of the progressive development toward an automation solution, this would be a stumbling block, because working together without conflict should be facilitated as much as possible.

Therefore the invention envisages that in addition to the individual inventories, a higher ranking inventory should also be administered with which the other inventories are signed. The higher ranking inventory here is called a meta-inventory to distinguish it from others. It serves as a cryptographic bracket over the entire status of the automation solution and below will be discussed on the basis of FIGS. 11A, 11B and 12.

Logically the software tool envisages that during normal development activity the meta-inventory should be signed by each person who is a member of the chief owner group or of a team of an authority area, meaning any authority area of the automation solution to create important versions, for example before starting up operation of a result of the development activity, what is called a release, the requirement may also apply that the meta-inventory must be signed by a member of the chief owner group. This can in particular be required or be an advantage for such releases that are supposed to be certified or have been certified according to the guidelines for functional safety. The software tool can take up the information in the signature for the meta-inventory, so that thereby a release status is signed.

Figure 11A:
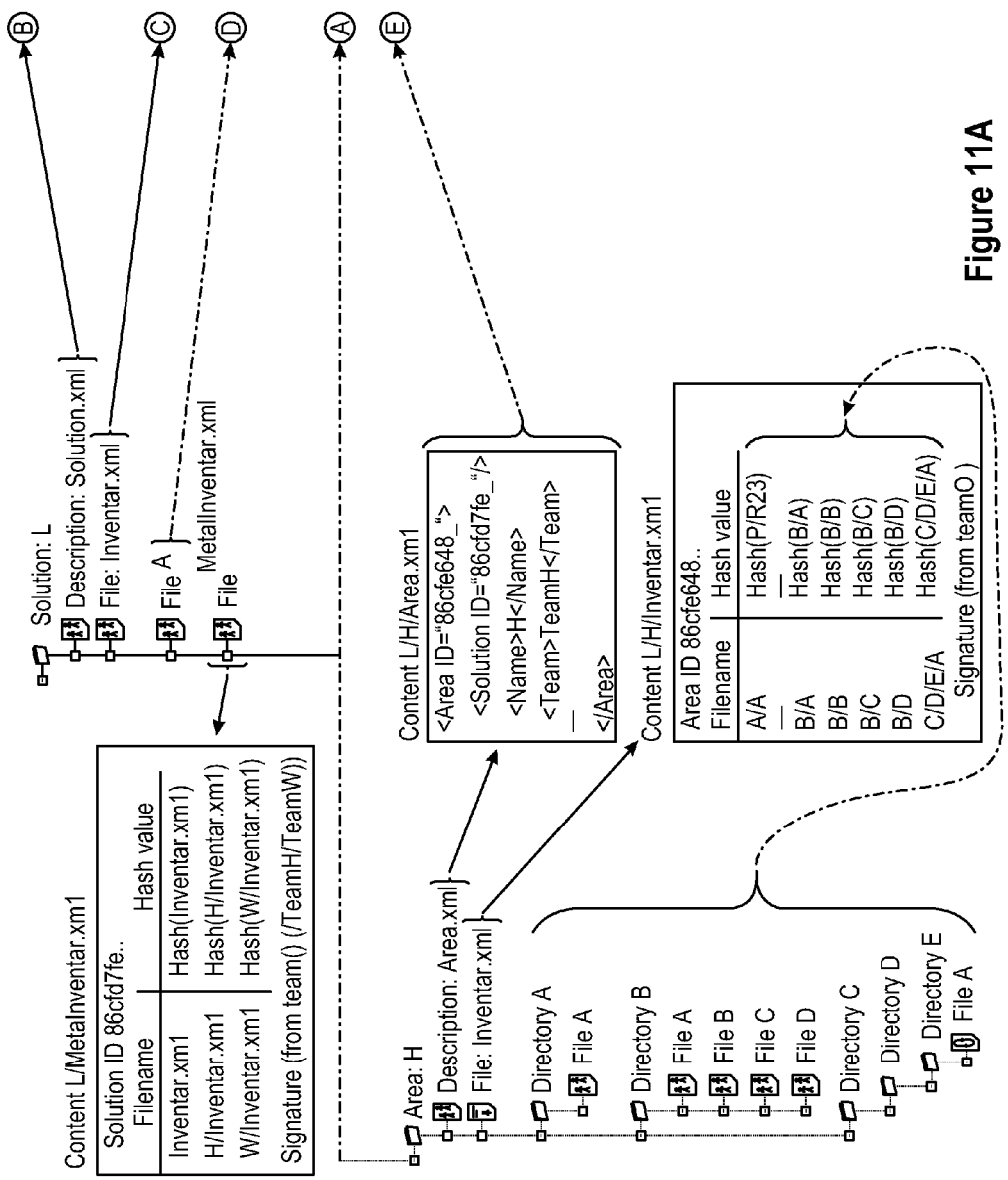
FIGS. 11A and 11B, a schematic presentation of the creation of the chief inventory, the meta-inventory, and the inventories of the authority areas within an automation solution.
Figure 11B:
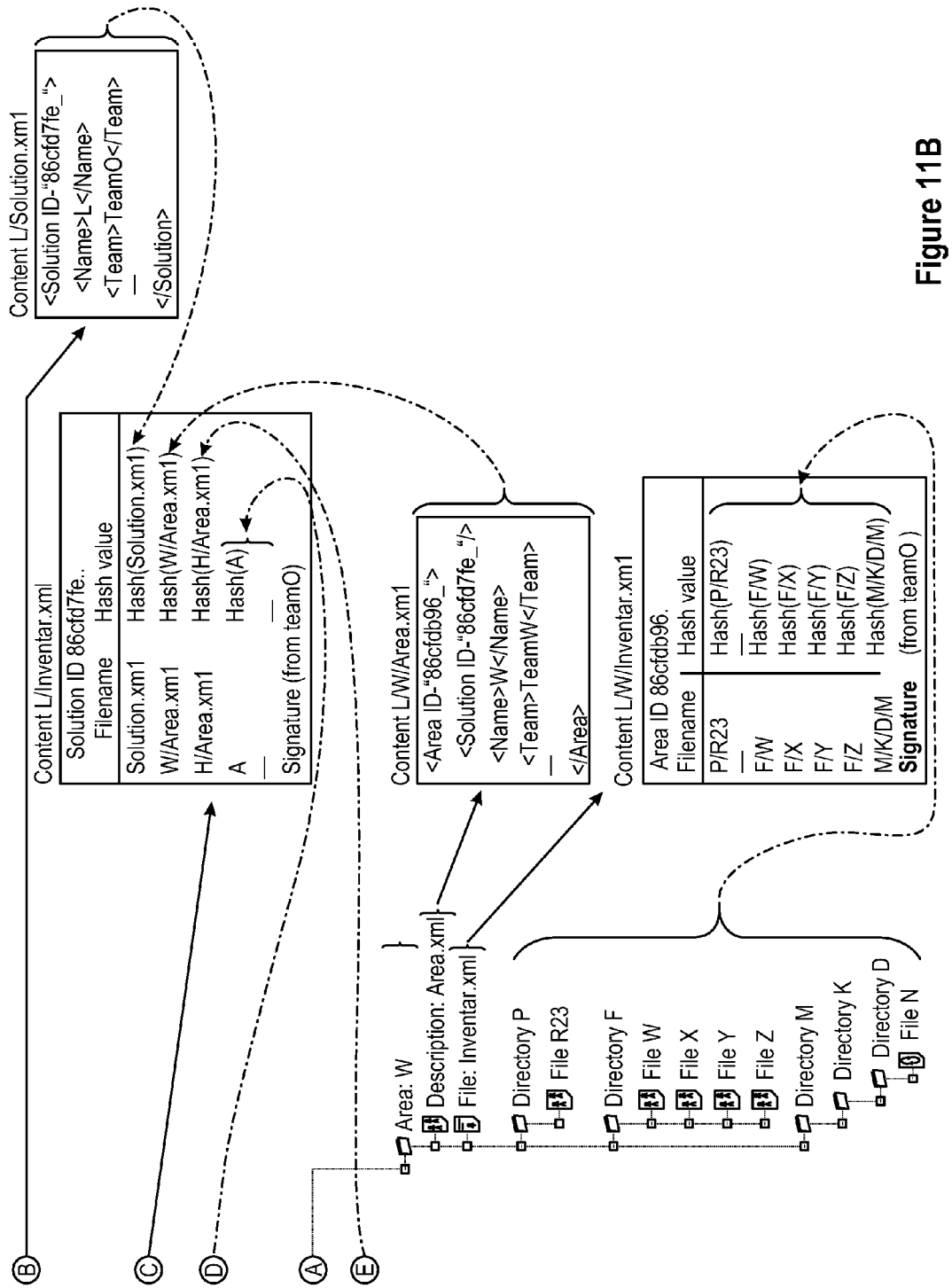

For example, in FIGS. 11A and 11B the construction of the chief inventory, of the meta-inventory, and of the inventories of the authority areas is described. An automation solution with the name "L" is filed in a directory with the name "L". Within the directory "L", whose content belongs to the chief authority area, is a file named "Solution.xml" with a description of the automation solution available, which gives a value to the identity (ID) "86cfd7fe. . ." And to the name "L" of the automation solution as well as a value to the name of the related chief owner group "TeamO".

The file "Inventar.xml" in the directory "L" contains the central inventory of the automation solution, thus the chief inventory. A file "MetaInventar.xml" is also contained in the same directory, which contains the meta-inventory in the sense of the invention.

A subdirectory exists in the directory "L" of the automation solution for each authority area and within these again for each one a description file for the authority area and an inventory file. The description file of an authority area repeats the identity of the automation solution to which the authority area along, and defines a specific identity (IV) for an authority area and a responsible team.

The chief inventory and the meta-inventory also both note the identity of the automation solution. On the other hand, an inventory in an authority area contains a value for the identity (ID) of the authority area. In addition, a table with data names and the hash values established for the contents of the files is contained in each inventory. Exemplary relations between files and their hash values in the inventories are symbolized in FIGS. 11A and 11B with the dotted arrows. Filenames are thereby named relative to the position of the inventory, thus as applicable with names of the subdirectory. Finally, each inventory is signed with its entire specific content.

Which set of files and related hash values are listed are contained in an inventory depends on the type of the inventory. An inventory for an authority area lists all the essential data within the authority area, except for the description file and the inventory itself. The chief inventory of the automation solution lists all essential data that are contained directly in the directory of the automation solution, here "L", except for the files of the chief inventory, of the meta-inventory, and the VKT files that overlap areas. The meta-inventory list all other inventory files and the area overlapping VKT parts as well as the hash values established for these files.

The chief inventory must be signed by a member of the chief owner group, here "TeamO". Each inventory of an authority area must be signed by a member of the responsible team, here "TeamH" or "TeamW".

On the other hand, according to the rules explained above the meta-inventory is to be signed by a member of any one of this team during a development phase, while it is to be signed by a member of the chief owner group on a special occasion, such as the release of the version or safety certification from organizational constraints, here "TeamO".

Finally, a second signature under the meta-inventory may come into being here which then can be called the seal signature, since the automation solution is especially sealed in a particular status with this.

In FIGS. 10, 11A and 11B, no VKT parts are marked in. To be sure, in FIGS. 11A and 11B the relationships between the files and their hash values in the inventories for the chief inventory and the inventories in the authority areas are presented, but there, for better comprehensibility, such a presentation of the relationship for the meta-inventory is lacking.

Figure 12:
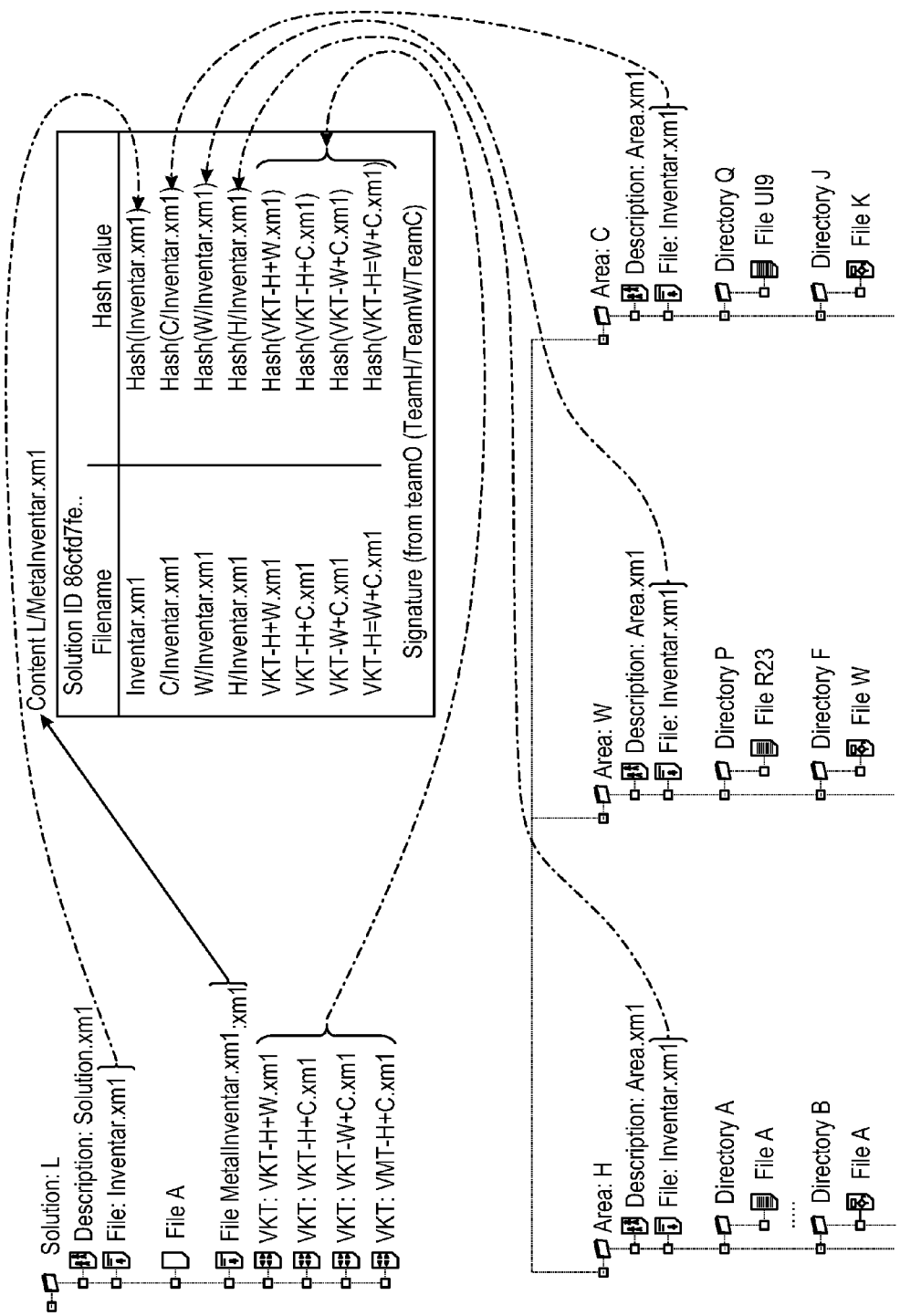
FIG. 12, a schematic presentation of the relationships of the meta-inventory both to the chief inventory and to the inventories of the authority areas and to the multi-area VKT parts within an automation solution.

Both the relationship of the meta-inventory to the contents of the file referenced by it through a hash value and the area overlapping VKT parts are presented now in FIG. 12, and as such they are proposed according to the fourth variant of the distribution of the VKT. Thereby files with VKT parts that affect several authority areas are found within the topmost directory "L" of the automation solution. To be sure, in FIG. 12, in comparison to FIGS. 11A and 11B, instead of two authority areas the three authority areas "H", "W", and "C" are present in an exemplary automation solution. The VKT parts, which belong to precisely one authority area are not further illustrated. However, like the files of an authority area within the authority area, they are stored and listed by the inventory of the particular authority area, which is to be signed by a member of the team of the authority area.

Previously it has been further explained that the meta-inventory lists all other inventories, and in addition those VKT parts that are allocated to several authority areas. In the example there are four VKT parts, each of which is already itself directly signed and contains the signatures themselves. These should be presented with a small seal symbol in the illustration.

The authority areas and the team allocated to them bring all other advantages with them so that as a result it is easy to set access rules based in a central storage area for the automation solution, and so that authority violations and overstepping of competences are not only recognized, but are prevented. When the central storage space is for example a network disk drive, it can be set there for the directory of the individual authority areas that only members of the allocated team may undertake changes in the particular directory, and only the chief owner group may set up or delete such directories.

If the central storage space for example is a version monitoring system like GIT, then the same type of access rules in the file system of the central system can be set in the GIT repository at a corresponding place in the directory and/or may set off access tests in what are called the commit triggers of GIT.

Figure 8:
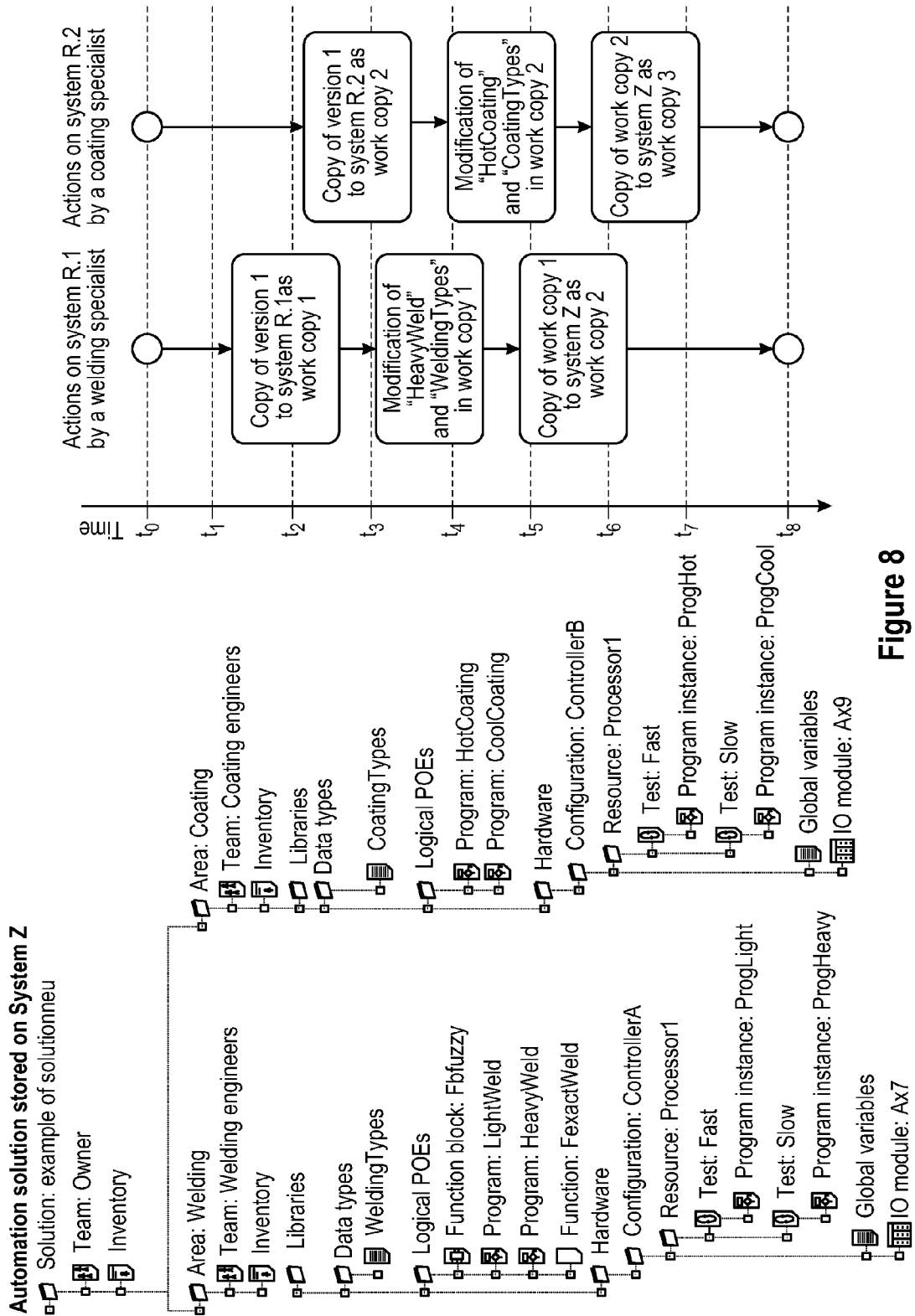
FIG. 8, a schematic presentation of the avoidance of a conflict based on a flow diagram.

From the example shown in FIG. 8, it is easily apparent that in the illustrated flow the welding specialist works on other objects of the automation solution then does the coating specialist. In the central storage space (System Z), therefore access rules in the file system or in the version monitoring system can be implemented, so that only welding specialists may undertake changes in the authority area "Welding" and only coating specialists may undertake changes in the authority area "Coating". As an additional access rule, it may be advantageously set in the central storage area that only members of the chief owner group of objects of the chief authority area may undertake changes, meaning on objects of the automation solution above the authority areas.

In works that last longer on an automation solution, in particular whose administration runs over several years and various versions, it occurs that tasks belonging to individual teams or owner groups change, for example persons who leave a team or are newly added to a team. In order to reliably be able to test each version of the automation solution according to the team membership valid at the time of its creation, the invention envisages that each signature is set with its time of creation and optionally tested through an additional timestamp stored cryptographically for the signature for later testing. The software tool according to the invention in the testing uses the time of the creation and signature in order to take into consideration in the test the status of the team and group members of those signing at that time.

There are many variants conceivable, which the software tool can bring the information of the team membership according to experience prevailing at a point in time. For example, the memberships in the form of attribute certificates of the person who signed (including old, already expired ones) can be stored in a designation service such as an LDAP server. In a particularly advantageous variant of the invention, the software tool accepts such testable evidence of team membership directly into an expanded signature, depending on long-term testable signatures.

Then it is not necessary to establish at a later test the previously valid memberships.

In another change to the automation solution, which according to the protective measures described above requires one or several inventories (also of the meta-inventory), according to one variant as part of the invention for example only one description of the changes of the inventory can be newly signed, instead of for example completely signing the entire inventory anew and whereby this change contains a cryptographically strong test total of the prior version of the inventory. The software tool in the automation solution can intentionally also store such a description of a change in its own inventory. Several such descriptions of changes can for example be cascaded, in particular in which a subsequent description of a change contains a cryptographically strong test total of the prior change description instead of the prior inventory, and the software tool in this way stores a sequence of change descriptions in addition to the inventory. This variant of the storage is conditional on greater computational expenditure in the authentication of automation solutions. However, at the same time it has the advantage that information is saved for unchanged files, that is, in particular who created them formerly or most recently changed them.

In order to recognize unauthorized manipulations through the various inventories and signatures, according to the invention at each use of a work copy or an instance of the automation solution or development project data, the correctness or the validity of the signatures is monitored or verified, in particular in this sense as to whether the signatures stems from a member of the particular allocated team. Ideally the software tool, being from a processing device of the development environment performed by a processing device of the environment development system, undertakes this test, for example at each opening of a work copy or upon request of the user. To this end the software tool must be so oriented that it can allocate the signatures to persons and persons to teams, and performs the test after a specific time period. In particular, the software tool requires access to the public verification tool allocated to the persons or users.

The course of the validity monitoring occurs advantageously in the following steps and particular partial steps, whereby an unauthorized manipulation is already revealed by a negative result from one of the steps or partial steps, and the integrity and authenticity of the automation solution set is determined only with exclusively positive results for all steps:

1. Testing of information supplied by a chief owner to the automation solution
    1.1. through the verification of the signature for the chief inventory and testing that the signature stems from a member of the team who is allocated to the automation solution as chief owner, 1.2. through the testing of the existence of an object of the automation solution designated in the inventory and 1.3. through the recalculation of a hash value for each object listed in the inventory and the comparison of the newly calculated hash value with that hash value supplied in the inventory.

2. Testing of each authority area in the automation solution 2.1. through the verification of the signature to the inventory of the authority area and testing that the signature stems from a member of the team who is allocated to the authority area as owner, 2.2. through the testing of the existence of an object of the automation solution designated in each inventory and 2.3. through the new calculation of a hash value for each object listed in the inventory and the comparison of the newly calculated hash value with that hash value supplied in the inventory.

And advisedly 3. to test that all relevant objects within the automation solution are designated in the related inventory, and also that no excess or unprotected object exists.

The above described steps can be carried out either completely or partially simultaneously without limiting the validity of the result either in another order of steps.

If for example an especially quick test is desired, all steps can be carried out the same time, and it is especially advantageous to perform the new calculation of the hash values on several objects of the automation solution simultaneously. Even omitting some validity monitoring is conceivable in a particular case.

In variants three and four it is necessary for the applicability of manipulation protection for the VKT that the software tool be so set up that in addition to the already described steps to test the integrity and authenticity of the automation solution, it also test the signatures of the directly signed VKT parts and whether the signatures stem from a correspondingly responsible person or responsible user who is then a member of the particular team.

For the applicability of the manipulation protection for the entire automation solution, the software tool must be so set up that the correct signature of the meta-inventory is performed as an additional step in testing the integrity and authenticity of an automation solution. This can essentially occur analogously to the partial steps of steps 1 or 2.

It may be explained from FIG. 8 of the exemplary flow diagram that on the basis of the data of a single work copy or instance of the automation solution, it can be tested as to whether the specific competences or authorities were maintained in the automation solution. Initially at the end of time period t8 the inventory in the authority area "Welding" bears the signature of the welding specialist, and the inventory in the authority area "Coating" bears the signature of the coating specialist, although both changes, and even competing changes, have been performed on the same automation solution. The correctness of the signatures and the authority of those signing can be tested on any work copy of version 3 on any System R. If for example, as a deviation from the flow diagram according to FIG. 8, system R.1 were to serve not a welding specialist, but a robot specialist, then it would later occur in a review of versions 2 or 3 based on a work copy of any system R that the signature on the inventory in the authority area "Welding" did not stem from a welding specialist.

The performance of testing steps for protection against manipulation, as described above, can occur in particular on workplace computers based on work copies of the automation solution. Alternatively or additionally, the testing steps can be carried out in the central repository, for example whenever a new version is to be inserted. This variant appears especially advantageous when the central repository for example is a storage in a so-called cloud. If the test fails, the central repository rationally refuses the acceptance of the new version, so that it is guaranteed that only integral and authentic versions are stored at any time.

The invention claimed is:

1. A method of data organization, the method comprising steps of:

organizing data according to a first structure by subdividing the data according to one of content aspects and aspects of right of access into a plurality of partial data sets, organizing the data according to a second structure by subdividing the data according to a plurality of authority areas having at least one of the plurality of partial data sets, each of the plurality of partial data sets includes at least one data unit;

allocating one or more user sets to each of the plurality of authority areas, each of the one or more user sets having at least one user;

including at least one of:
a data unit only in a specific one of the plurality of authority areas, and
at least one user in the one or more user sets;

further comprising the steps of:

preparing a main authority area according to the additional structure and assigning an authority main user set to the main authority area, wherein the main user set includes at least one user;

creating linking information from a variant selected from a group consisting of a first variant, a second variant, a third variant and a fourth variant, wherein, for the first variant, each portion of linking information is allocated to the main authority area and only the main user set is responsible for such a portion of linking information, wherein, for the second variant, the portion of linking information is allocated depending upon a condition selected from a first condition, a second condition, a third condition and a fourth condition, wherein:
the first condition comprises: to the main authority area, if all the data units involved in the link are included only by the main authority area, wherein only the main user set is responsible for such an item of linking information, the second condition comprises: to the main authority area, if all the data units involved in the link are included by the main authority area and by another responsibility area, wherein only the main user set is responsible for such an item of linking information, the third condition comprises: to the main authority area, if all the data units involved in the link are included by various authority areas, wherein only the main user set is responsible for such an item of linking information, and the fourth condition comprises: to an authority area if all the data units involved in the link are included in this authority area, wherein an allocated user set for such linking information is assigned as responsible for this authority area, wherein, for the third variant, the linking information is allocated to the main authority area, depending upon a condition selected from a fifth condition, a sixth condition, a seventh condition and an eighth condition, wherein:

the fifth condition comprises: if all the data units involved in the link are included only by the main authority area, wherein only the main user set is responsible for such an item of linking information, the sixth condition comprises: if all the data units involved in the link are included by the main authority area and by another responsibility area, wherein only the main user set is responsible for such an item of linking information, the seventh condition comprises: if all the data units involved in the link are included by various authority areas, wherein the main user set or a set of users from these authority areas is each assigned as responsible for such an item of linking information, the eighth condition comprises: if all the data units involved in the link are included by only one authority area, wherein the main user set or the user set allocated to this authority area is responsible for such a portion of linking information, wherein, for the fourth variant, the linking information is allocated depending upon a condition selected from a ninth condition, a tenth condition, an eleventh condition and a twelfth condition, wherein:

the ninth condition comprises: to the main authority area, if all the data units involved in the link are included only by the main authority area, wherein only the main user set is responsible for such an item of linking information, the tenth condition comprises: to the main authority area, if all the data units involved in the link are included by the main authority area and by another responsibility area, wherein only the main user set is responsible for such an item of linking information, the eleventh condition comprises: to the main authority area, if all the data units involved in the link are included by various authority areas, the main user set or a set of users from these authority areas is each assigned as responsible for such an item of linking information, and the twelfth condition comprises: to an authority area, if all the data units involved in the link are included in this authority area, wherein an allocated user set for such linking information is assigned as responsible for this authority area.

2. The method of claim 1, further comprising the steps of:

preparing a main authority area according to the additional structure; and allocating the main authority area superior to the authority area, so that the main authority area indirectly includes all the partial data sets included in the authority areas, wherein the main authority area also directly includes each partial data set of the data set that is not included by any authority area, wherein each partial data set includes at least one data unit, wherein a responsible user set is allocated to each authority area, and wherein the main user set includes at least one user.

3. The method of claim 1, further comprising the steps of:

preparing a main authority area according to the additional structure and assigning an authority main user set to the main authority area, wherein the main user set includes at least one user; and allocating at least a first portion of description information to the main authority area, wherein the first portion of description information includes a portion of identification information selected from a group consisting of information of the main authority area and information of the responsible main user set, wherein in each case at least a second portion of description information is allocated to each authority area, wherein the second portion of description information includes a portion of identification information selected from a group consisting of information of the authority area, information of the main authority area, and information of the responsible user set.

4. The method of claim 1, further comprising a step of: preparing at least one link between data units, wherein a portion of linking information is created for the link, which includes a portion of identification information selected from a group consisting of information of the link, information of the main authority area, and information of each authority area involved in the link.

5. The method of claim 1, wherein in each case a portion of testing information is communicated for at least one first description portion of information allocated to the main authority area, and with regard to each authority area for in each case at least one second portion of information allocated to the particular authority area, and for essentially each data unit covered directly by the main authority area, and for each portion of linking information allocated to the main authority area according to the first or second variant, wherein a main inventory is allocated to the main authority area, which includes each portion of test information like this one and for each portion of test information there is an indicator portion of information on the description portion of information of the particular test information or linking information or data unit, and in each case a portion of testing information is communicated for the data unit covered essentially in each case by an authority area, and for each portion of linking information allocated to an authority area of one of the second and fourth variant, wherein an inventory is allocated to the main authority area, which includes each portion of test information like this one and for each portion of test information there is an indicator portion of information for the underlying linking portion of information or data unit.

6. The method of claim 5, wherein when there is writing access to a data unit for which a test total is included by an inventory, by the main inventory, or by the meta-inventory, signing of the data unit occurs in a way that a new portion of testing information is established for this data unit that is to be stored, the portion of testing information for this data unit that is included by the inventory, the main inventory, or the meta-inventory is replaced by the newly established portion of testing information, and instead of this data unit replacing the inventory, the main inventory, or the meta-inventory, which includes the newly established testing information for this data unit by importing the signature information that is assigned to the user initiating the writing access, a portion of monitoring information is established and this is assigned to this inventory, main inventory, or meta-inventory.

7. The method of claim 5, further comprising the steps of:
monitoring for the main inventory allocated to the main authority area, the validity of the monitoring information allocated to the main inventory with the inclusion of at least one portion of verification information, wherein a positive result is achievable only through a portion of verification information that is allocated to a user who belongs to the main user set;
monitoring for the main inventory allocated to the main authority area the validity of each of the portions of indicator information included by the main inventory;
monitoring the existence of the data unit given by the particular portion of indicator information, wherein a positive result is achievable only when the data unit given by the indicator information is available;
monitoring for the inventory allocated to the main authority area, the validity of each portion of testing information included by the main inventory;
recalculating for the data unit given by the particular portion of indicator information; and
comparing the newly calculated portion of testing information included in the main inventory to the portion of testing information, wherein a positive result is achievable only if the newly calculated portion of testing information agrees with the testing information included in the main inventory.

8. The method of claim 7, further comprising the steps of:
monitoring, for each additional data unit included by the main authority area that includes an allocated portion of monitoring information, the validity of this monitoring information with the inclusion of at least one portion of verification information, wherein a positive result is achievable only with a portion of verification information that is allocated to a user who belongs to the main user set or belongs to a partial user set that is responsible for this data unit in so far as this data unit is a portion of linking information according to the third or fourth variant;
monitoring, for each additional data unit included by a particular authority area that includes an allocated portion of monitoring information, the validity of this monitoring information with the inclusion of at least one portion of verification information,
wherein a positive result is achievable only with a portion of verification information that is allocated to a user who belongs to the main user set or belongs to the user set that is responsible for this authority area that also includes this data unit.

9. The method of claim 1, wherein in each case an unambiguous portion of testing information is established
for each inventory allocated to a particular authority area, and
for the inventory allocated to the main authority area, and
for each portion of linking information allocated to the main authority area according to one of the third and fourth variant,
wherein a meta-inventory is allocated to the main authority area, which includes each portion of test information like this one and for each portion of test information there is an indicator portion of information on the portion of linking information lying at the basis of the particular test information or on the inventory or main inventory underlying the particular portion of test information data unit.

10. The method of claim 9, wherein at least one portion of description information allocated to the main authority area and a portion of linking information and the main inventory allocated to the main authority area and the meta-inventory presents in each case a data unit included by the main authority area, and that at least one portion of description information allocated to an authority area and linking information and inventory allocated to the authority area presents another data unit included by this authority area.

11. The method of claim 1, wherein the data set is stored in a superior position according to the additional structure.

12. The method of claim 1, further comprising a step of preparing a main authority area according to the additional structure and assigning an authority main user set to the main authority area, wherein the main user set includes at least one user;
wherein for each user, who is included by at least one user set, which is allocated to an authority area, and is included by the main user set that is allocated to the main authority area, there is allocated an unambiguous portion of signature information and an unambiguous portion of verification information corresponding to it.

13. The method of claim 12, wherein when there is a writing access to a data unit, signing of this data unit occurs, in which a portion of monitoring information is communicated and allocated to this data unit for this data unit to be stored with inclusion of the signature information that is allocated to the user who initiates the writing access.

14. The method of claim 13, further comprising the step of: establishing, upon signing, the portion of monitoring information through the additional import of a portion of time information.

15. The method of claim 13, wherein at least one valid monitoring takes place triggered by request of a user or by an initial reading or writing access within a predetermined time period for at least one data unit, wherein the positive or negative result of the valid monitoring is indicated.

16. The method of claim 15, further comprising the steps of:
monitoring, for the meta-inventory allocated to the main authority area, the validity of the monitoring information allocated to the meta-inventory with the inclusion of at least one portion of verification information, wherein a positive result is achievable only through a portion of verification information that is allocated to a user who belongs to the main user set or belongs to a user set that is allocated to one of the authority areas;
monitoring, for the meta-inventory allocated to the main authority area, the validity of each of the portions of indicator information included in the meta-inventory;
monitoring the existence of given data unit by the particular portion of indicator information, wherein a positive result is achievable only the data unit given by the portion of indicator information exists;
monitoring for the meta-inventory allocated to the main authority area, the validity of the testing information allocated to the meta-inventory;
recalculating, for the data unit given by the particular portion of indicator information, the testing information; and
comparing the newly calculated testing information with the testing information contained in the meta-inventory, wherein a positive result is achievable only if the newly calculated testing information agrees with the testing information included in the meta-inventory.

17. The method of claim 15, further comprising the steps of:
monitoring, for each inventory allocated to an authority area, the validity of the monitoring information allocated to the inventory by including at least one portion of verification information, wherein a positive result is achievable only with a portion of verification information that is allocated to a user who belongs to the main user set or belongs to the user set to which this inventory is also allocated;

monitoring, for each inventory allocated to an authority area, the validity of each portion of indicator information included by the inventory;

monitoring the existence of the data unit given by the particular portion of indicator information, wherein a positive result is achievable only when the data unit given by the indicator information exists;

monitoring, for each inventory allocated to an authority area, the validity of each portion of test information included by the inventory;

recalculating, for the data unit given by the particular portion of indicator information the testing information; and comparing the newly calculated test information with the test information contained in the inventory, wherein a positive result is achievable only if the newly calculated test information agrees with the test information contained in the inventory.

18. The method of claim 15, wherein upon monitoring of the validity of a portion of monitoring information that is established by additional import of a portion of time information, a positive result of the monitoring of validity is achievable only through a portion of verification information that is allocated to a user, who, in the time period noted in the portion of time information, belongs to a set selected from a group consisting of:
   the main user set,
   a user set that is allocated to one of the authority areas, wherein the monitoring information is allocated to the meta-inventory,
   the user set that is allocated to the same authority area to which the inventory is allocated, to which this monitoring information is allocated,
   the partial set of users that is responsible for the data unit that is allocated to this portion of monitoring information, wherein the data unit is a portion of linking information according to the third or fourth variant, and
   the set of users that is allocated to the same authority area that also includes the data unit that is allocated to this portion of monitoring information.

19. The method of claim 15, further comprising a step of: performing a test as to whether more data units are included than exist in any inventory.

20. The method of claim 1, further comprising a step of, when there is writing access to a set of partial data or to a data unit, storing a new version of the set of partial data or data unit.

21. The method of claim 1, wherein the data set includes development project data from a software development project, the development project data comprising: program code; configuration data; and parameter data for an automation unit.

* * * * *